(12) United States Patent
Ishikawa et al.

(10) Patent No.: US 9,714,664 B2
(45) Date of Patent: Jul. 25, 2017

(54) METHOD FOR MANUFACTURING IMPELLER

(71) Applicant: HONDA MOTOR CO., LTD., Tokyo (JP)

(72) Inventors: Hiroshi Ishikawa, Tochigi (JP); Yoshinori Tsurugai, Tochigi (JP); Yasuhisa Saito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 620 days.

(21) Appl. No.: 14/351,908

(22) PCT Filed: Oct. 17, 2012

(86) PCT No.: PCT/JP2012/076847
§ 371 (c)(1),
(2) Date: Apr. 15, 2014

(87) PCT Pub. No.: WO2013/058284
PCT Pub. Date: Apr. 25, 2013

(65) Prior Publication Data
US 2014/0328689 A1   Nov. 6, 2014

(30) Foreign Application Priority Data

Oct. 17, 2011 (JP) ................. 2011-228086
Apr. 2, 2012 (JP) ................. 2012-083871
Jul. 10, 2012 (JP) ................. 2012-154832

(51) Int. Cl.
*F04D 29/28* (2006.01)
*B29C 37/00* (2006.01)
(Continued)

(52) U.S. Cl.
CPC ........ *F04D 29/284* (2013.01); *B29C 37/0021* (2013.01); *F04D 17/10* (2013.01);
(Continued)

(58) Field of Classification Search
CPC ...... F04D 29/023; F04D 29/325; F04D 17/10; F04D 29/026; F04D 29/285;
(Continued)

(56) References Cited

U.S. PATENT DOCUMENTS 4,502,837 A  3/1985  Blair et al.
4,653,976 A  3/1987  Blair et al.
(Continued)

FOREIGN PATENT DOCUMENTS

JP  59-018296   1/1984
JP  2004-156591  6/2004
(Continued)

OTHER PUBLICATIONS

Chinese Office Action dated Aug. 24, 2015, 6 pages.

*Primary Examiner* — Mark Laurenzi
*Assistant Examiner* — Shafiq Mian
(74) *Attorney, Agent, or Firm* — Rankin, Hill & Clark LLP

(57) ABSTRACT

An impeller in which a plurality of vanes are provided so as to overlap each other back and forth as viewed in the direction of axis has a first impeller part on a front side and a second impeller part on a rear side. A method for manufacturing impeller includes a step of molding a first impeller part, a step of molding a second impeller part and a step of combining together the first impeller part and the second impeller part.

12 Claims, 24 Drawing Sheets

(51) Int. Cl.

| | |
|---|---|
| *F04D 17/10* | (2006.01) |
| *F04D 29/62* | (2006.01) |
| *F04D 29/02* | (2006.01) |
| *F04D 29/22* | (2006.01) |
| *B29L 31/08* | (2006.01) |
| *B29L 31/00* | (2006.01) |
| *B29C 65/08* | (2006.01) |
| *B29C 65/00* | (2006.01) |

(52) U.S. Cl.
CPC ......... *F04D 29/023* (2013.01); *F04D 29/026* (2013.01); *F04D 29/2222* (2013.01); *F04D 29/285* (2013.01); *F04D 29/624* (2013.01); *B29C 65/08* (2013.01); *B29C 66/124* (2013.01); *B29C 66/30223* (2013.01); *B29C 66/54* (2013.01); *B29C 66/73921* (2013.01); *B29C 66/8322* (2013.01); *B29L 2031/08* (2013.01); *B29L 2031/7496* (2013.01); *F05D 2230/23* (2013.01); *F05D 2300/43* (2013.01)

(58) Field of Classification Search
CPC .. F04D 29/284; F04D 29/624; F04D 29/2222; F05D 2230/51; F05D 2230/21; Y10T 29/49327
See application file for complete search history.

(56) References Cited

U.S. PATENT DOCUMENTS

2004/0083609 A1      5/2004  Malott
2006/0280609 A1*    12/2006  Ranz .................... B23P 15/006
                                                              416/182

FOREIGN PATENT DOCUMENTS

| JP | 2004-232525 | 8/2004 |
| JP | 2006-526734 | 11/2006 |
| JP | 2010-269417 | 12/2010 |
| WO | 2004/109118 | 12/2004 |

* cited by examiner (a)

(b)

(a)

(b)

(a)

(b)

METHOD FOR MANUFACTURING IMPELLER

CROSS-REFERENCE TO RELATED APPLICATIONS

The present application claims the benefit of priority of Japanese Patent Applications No. 2011-228086 filed on Oct. 17, 2011, No. 2012-083871 filed on Apr. 2, 2012, and No. 2012-154832 filed on Jul. 10, 2012, which is incorporated herein by reference.

TECHNICAL FIELD

The present invention relates to a method for manufacturing impeller.

BACKGROUND ART

An impeller is used in, for example, a compressor or a pump. This type of impeller is required to be small in size and highly efficient and is desired to be designed into a shape which satisfies the requirements. To impart kinetic energy from the impeller to a fluid with good efficiency, it is advantageous that the contact area of vanes of the impeller with the fluid becomes larger. Thus, demanding high efficiency results in larger vanes. Further, attempting to reduce the size of the impeller while satisfying the requirements by changing continuously the shape of the impeller from an entrance to an exit of the fluid, the impeller has a shape in which vanes are overlapped each other.

When fabricating an impeller having such a shape, a multispindle machine tool is used to skive it from a block material (refer to JP-A-2010-269417).

When the multispindle machine tool is used, however, the working time becomes long to reduce the manufacturing efficiency, and moreover, the manufacturing cost is increased.

Because of this, even though it is attempted to use a mold to mass produce impellers through molding (including resin molding and casting) in order to increase the productivity, the shape of the impeller prohibits the removal of the mold. Because of this, it is not possible to mold the impeller using the mold. Although it is possible to mold the impeller using the lost wax process, this process is expansive, and hence, it is actually difficult to apply the lost wax process to mass produce impellers of that type.

SUMMARY OF THE INVENTION

According to an embodiment of the invention, a method for manufacturing impeller is provided in which an impeller can be molded by using a mold, thereby making it possible to fabricate the impeller at low cost.

According to another embodiment of the invention, an impeller is provided which is easy to be fabricated and is highly strong and which has high rotation accuracy.

BRIEF DESCRIPTION OF DRAWINGS

FIG. 16(a2), FIG. 16(b2), FIG. 16(c2), FIG. 16(d2), and FIG. 16(e2) are side views showing the process of removing the rotary mold.

DESCRIPTION OF EMBODIMENTS

Figure 1:
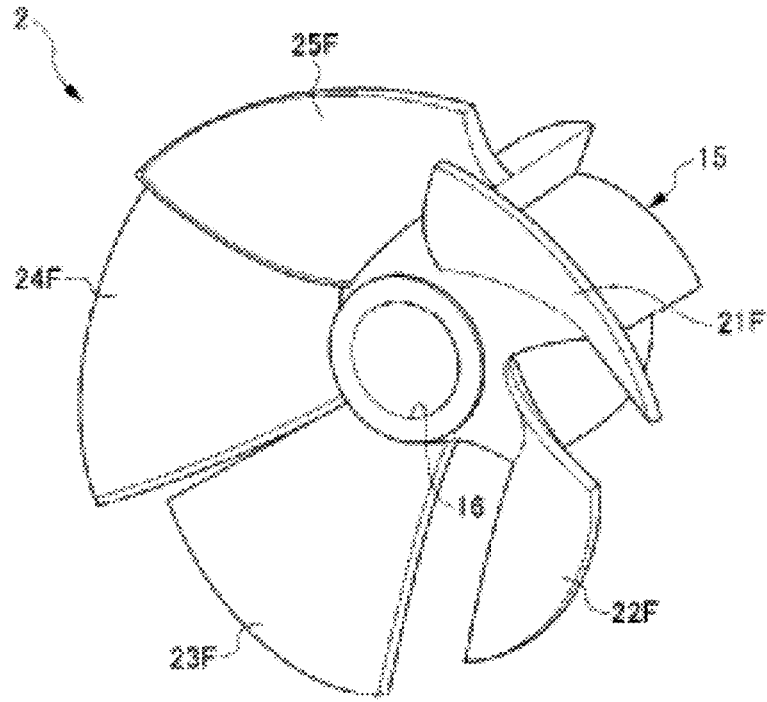
FIG. 1(a) is a perspective view of a first impeller part of an impeller according to a first embodiment as viewed obliquely from a front thereof.
FIG. 1(b) is a perspective view of a second impeller part of the impeller of the first embodiment as viewed obliquely from a front thereof.
Figure 1:
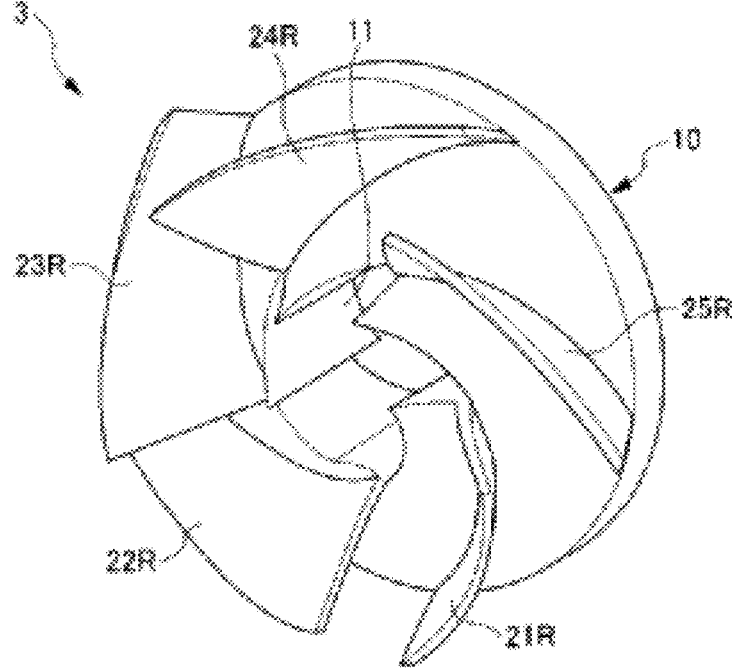

Hereinafter, embodiments will be described by reference to the drawings.

<First Embodiment>

FIGS. 1(a) to 4 are drawings showing an impeller 1 according to a first embodiment and a first impeller part 2 and a second impeller part 3 which make up the impeller 1.

As shown in FIGS. 1(a) to 4, the impeller 1 includes a base 10 which is disposed at a rear surface, a shaft portion 15 which projects from a center portion of a front surface of the base 10 to the front, and a plurality of vanes 20 (specifically speaking, five vanes 21 to 25) which project sideways from an outer circumferential surface of the shaft portion 15. Hereinafter, reference numeral 20 will be used to describe the plurality of vanes indiscriminately, and reference numerals 21 to 25 will be used to describe the vanes discriminately.

Figure 3:
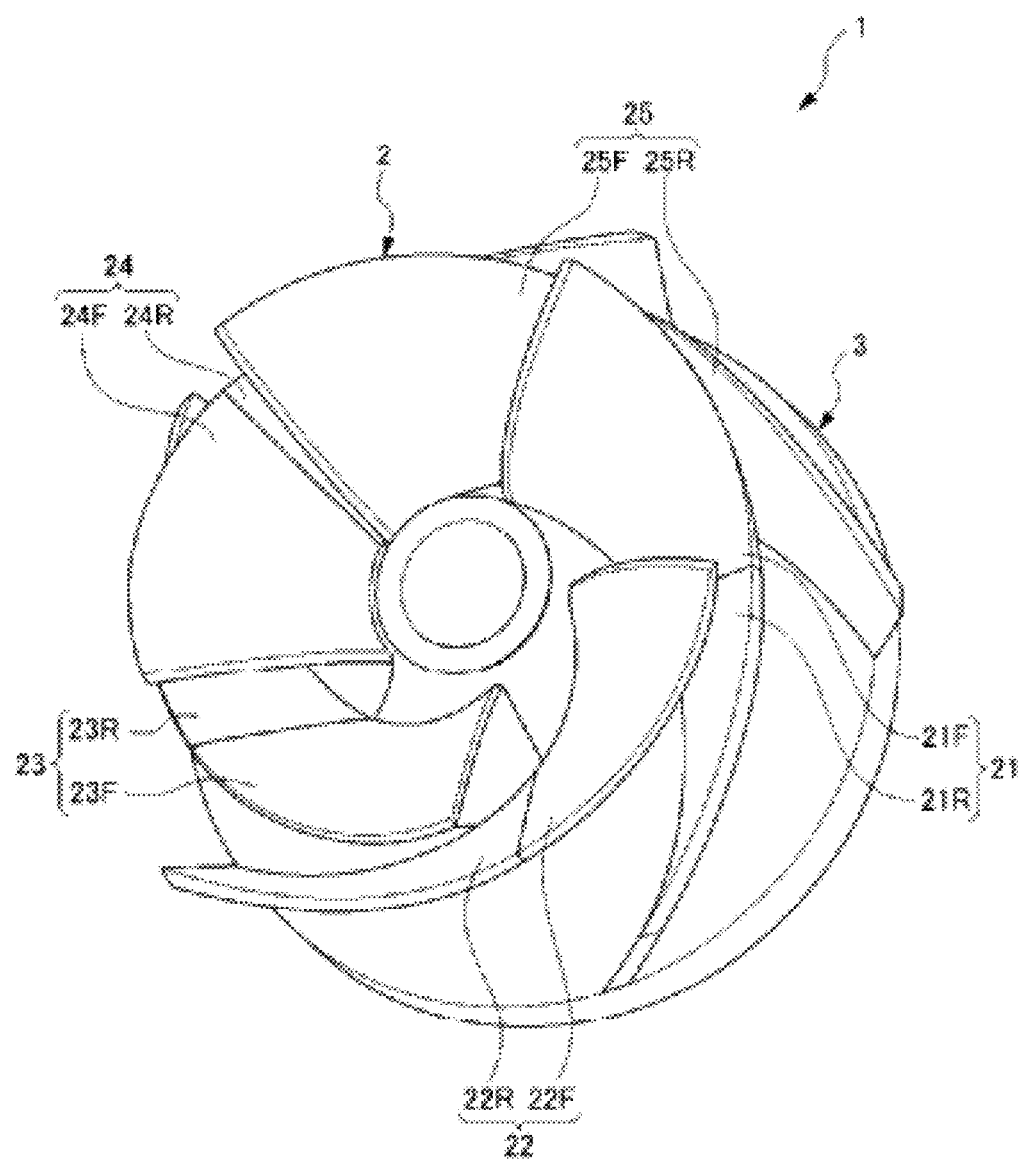
FIG. 3 is a perspective view which shows a state in which the first impeller part and the second impeller part which are shown in FIG. 2 are combined together into an impeller.

As shown in FIG. 3, in the impeller 1, the plurality of vanes 20 are provided so as to overlap each other back and forth as viewed from the front in the direction of an axis thereof. Specifically speaking, when viewed from the front in the direction of the axis, about a half of a vane 21 is hidden behind a vane 22, about a half of the vane 22 is hidden behind a vane 23, about a half of the vane 23 is hidden behind a vane 24, about a half of the vane 24 is hidden behind a vane 25, and about a half of the vane 25 is hidden behind the vane 21. The impeller 1 having this shape cannot actually be removed from a mold, and therefore, it is not possible to mold the impeller 1 as a single unit.

Then, the impeller 1 is divided into two parts of a first impeller part 2 and a second impeller part 3. As this occurs, the whole of the impeller 1 is not simply divided by a parting plane which is normal to the direction of the axis of the impeller 1. The individual vanes 20 are divided into two along a parting line which extends substantially along a radial direction thereof so that the vanes 20 are divided into front and rear sides as viewed from the front thereof in the direction of the axis of the impeller 1.

Specifically speaking, as shown in FIG. 3, the vane 21 is divided into a front side (a front vane) 21F and a rear side (a rear vane) 21R. The vane 22 is divided into a front side (a front vane) 22F and a rear side (a rear vane) 22R. The vane 23 is divided into a front side (a front vane) 23F and a rear side (a rear vane) 23R. The vane 24 is divided into a front side (a front vane) 24F and a rear side (a rear vane) 24R. The vane 25 is divided into a front side (a front vane) 25F and a rear side (a rear vane) 25R.

The front vanes 21F to 25F project sideways from the outer circumferential surface of the shaft portion 15. The rear vanes 21R to 25R project sideways from the front surface of the base 10. In conjunction with the division of the vanes 20, the base 10 and the shaft portion 15 are also divided. The base 10 and the shaft portion 15 are divided along the direction of the axis. Namely, the shaft portion 15 has such a length that the shaft portion 15 penetrates the base 10 to reach a rear surface of the base 10 at a rear end thereof.

Figure 4:
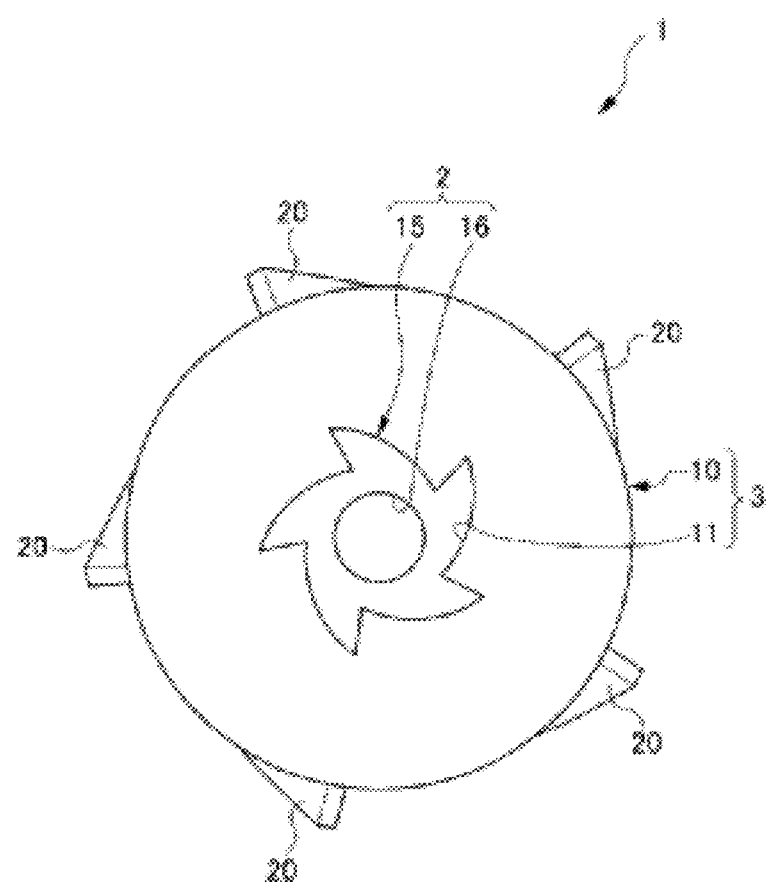
FIG. 4 is a rear view of the impeller shown in FIG. 3.

As shown in FIG. 4, the outer circumferential surface of the shaft portion 15 is formed into a shape which is suitable for the five front vanes 21F to 25F to project therefrom, the shape being deformed as required based on a pentagonal shape, for example. An axial hole 16 is formed in a central portion of the shaft portion 15 so as to penetrate a center line.

The axial hole 16 is a hole through which a rotating shaft (its illustration being omitted) which supports the impeller 1 is inserted to be fixed. An accommodating hole 11 which accommodates a rear part of the shaft portion 15 along the direction of the axis is formed in a central portion of the base 10. The shape of the accommodating hole 11 corresponds to the shape of the outer circumferential surface of the shaft portion 15.

As shown in FIG. 1(a), the first impeller part 2 includes integrally the shaft portion 15 which has the axial hole 16 in the central portion and the five front vanes 21F to 25F which project sideways from the outer circumferential surface of the shaft portion 15. As shown in FIG. 1(b), the second impeller part 3 includes integrally the base 10 which has the accommodating hole 11 in the central portion and the five rear vanes 21R to 25R which project to the front from the front surface of the base 10.

Here, the dividing position where the vanes 21 to 25 are divided into the front vanes 21F to 25F and the rear vanes 21R to 25R. There is imposed no specific limitation to the dividing position of this type of the vanes 21 to 25. For example, it is possible that the vanes 21 to 25 are divided, for example, in a positional relationship in which part of the front vane 21F is hidden behind the front vane 22F. In this embodiment, however, all the five front vanes 21F to 25F do not overlap each other as viewed from the front in the direction of the axis. Similarly, all the five rear vanes 21R to 25R do not overlap each other as viewed from the front in the direction of the axis, either.

Next, a manufacturing method of the impeller 1 as described above will be described. This manufacturing method of the impeller 1 includes a first step of molding one impeller part of the two divided parts, a second step of molding the other impeller part, and a third step of combining the one impeller part and the other impeller part together into the impeller 1.

The first impeller part 2 may be molded in the first step, and the second impeller part 3 may be molded in the second step. The second impeller part 3 may be molded in the first step, and the first impeller part 2 may be molded in the second step. Hereinafter, the case will be described where the first impeller part 2 is molded in the first step, and the second impeller part 3 is molded in the second step.

<First Step>

The impeller part 2 can be molded by using a mold 30 which is made up of an upper mold 31 and a lower mold 32 since all the five front vanes 21F to 25F do not overlap each other when viewed from the front in the direction of the axis.

Figure 5:
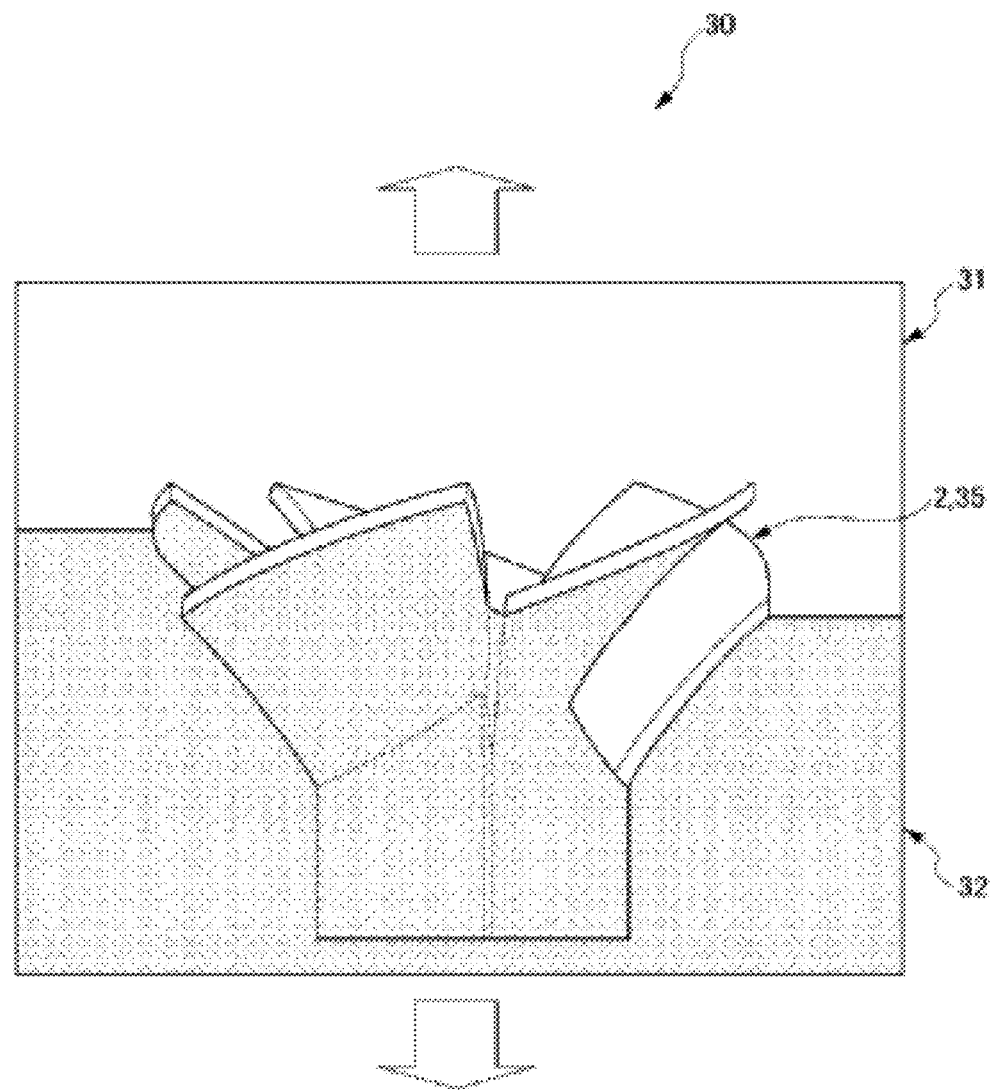
FIG. 5 is an explanatory drawing which shows a parting line of a mold which is used to mold the first impeller part shown in FIG. 1(a) and directions in which the mold is released.

For example, the mold 30 which has a cavity 35 which corresponds to the first impeller part 2 is prepared in a boundary area between the upper mold 31 and the lower mold 32 as shown in FIG. 5. In this case, a parting line of the mold 30 is somewhere on end faces of the front vanes 21F to 25F.

A desired plastic material is injected by using this mold 30. After the injection, the upper mold 31 and the lower mold 32 of the mold 30 are released upwards and downwards, respectively, whereby the first impeller part 2 is removed from the mold 30 without any problem. Thus, the first impeller part 2 is molded by using the mold 30.

<Second Step>

In the second impeller part 3, all the five rear vanes 21R to 25R and the base 10 overlap each other when viewed from the front in the direction of the axis, and therefore, when the mold 30 made up of the upper mold 31 and the lower mold 32 are used, the overlapping portions cannot be removed from the mold 30.

Figure 6:
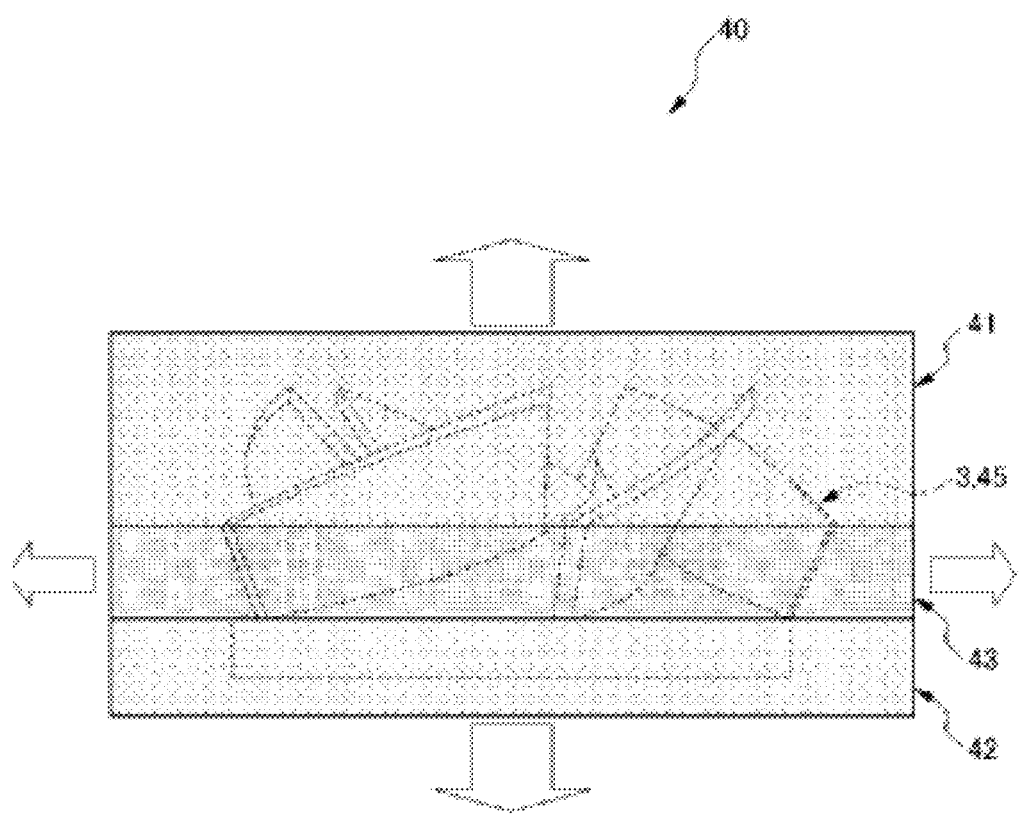
FIG. 6 is an explanatory drawing which shows parting lines of a mold which is used to mold the second impeller part shown in FIG. 1(b) and directions in which the mold is released.
Figure 7:
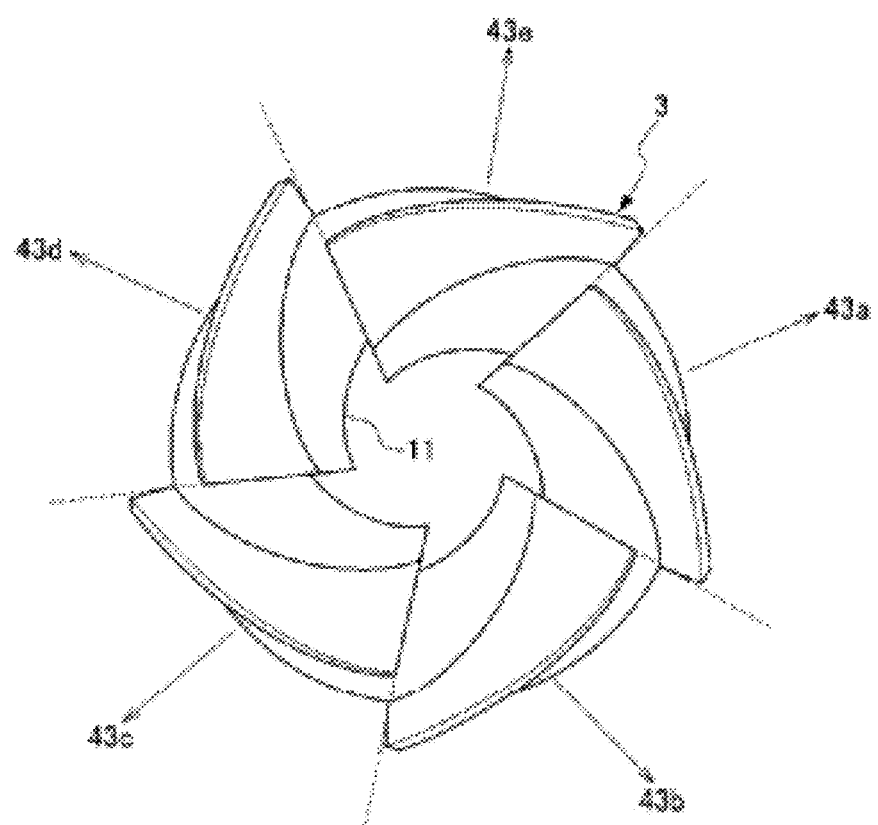
FIG. 7 is an explanatory drawing which shows directions in which slides of the mold shown in FIG. 6 are removed.

Then, as shown in FIGS. 6, 7, the second impeller part 3 can be molded by using a mold 40 which includes a required number (for example, five which is identical with the number of rear vanes 21R to 25R) of slides (inserts) 43 (43a to 43e) in addition to an upper mold 41 and a lower mold 42.

For example, the mold 40 which has a cavity 45 which corresponds to the second impeller part 3 is prepared in a boundary area between the upper mold 41, the lower mold 42 and the slides 43 (43a to 43e) as shown in FIG. 6. In this case, parting lines of the mold 40 reside in part of the base 10 and end faces of the rear vanes 21R to 25R.

For example, a desired plastic material is molded through injection molding by using this mold 40. After molding, the slides 43 (43a to 43e) are removed radially as shown in FIG. 7, whereafter, the upper mold 41 and the lower mold 42 are released upwards and downwards, respectively, whereby the second impeller part 3 is removed from the mold 40 without any problem. Thus, the second impeller 3 is molded by using the mold 40.

<Third Step>

Figure 2:
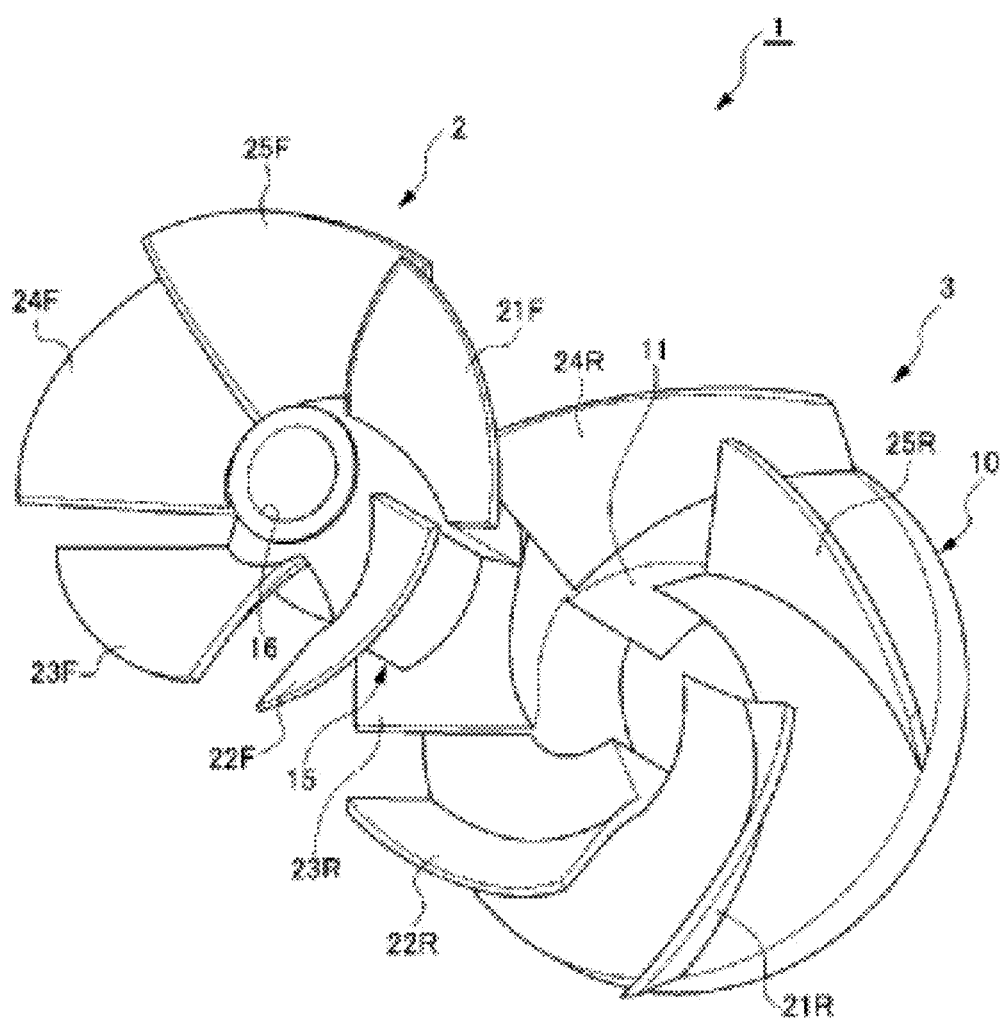
FIG. 2 is a perspective view which shows a state in which the first impeller part and the second impeller part which are shown in FIG. 1(a) and FIG. 1(b), respectively, are disposed on the same axis and with their phases matched with each other.

With the first impeller part 2 molded in the first step and the second impeller part 3 molded in the second step disposed on the same axis with their phases matched with each other as shown in FIG. 2, the first impeller part 2 and the second impeller part 3 are moved along the direction of the axis, so that the shaft portion 15 is accommodated to a predetermined depth (a depth where a rear end face of the shaft portion 15 coincides with the rear surface of the base 10) in the accommodating hole 11 in the base 10. Then, all the five front vanes 21F to 25F and all the five rear vanes 21R to 25R are positioned so as to be adjacent to each other across the dividing line.

Specifically speaking, as shown in FIG. 3, the front vane 21F and the rear vane 21R are positioned adjacent to each other to make up the complete vane 21. The front vane 22F and the rear vane 22R are positioned adjacent to each other to make up the complete vane 22. The front vane 23F and the rear vane 23R are positioned adjacent to each other to make up the complete vane 23. The front vane 24F and the rear vane 24R are positioned adjacent to each other to make up the complete vane 24. The front vane 25F and the rear vane 25R are positioned adjacent to each other to make up the complete vane 25.

As this occurs, for example, the first impeller part 2 and the second impeller part 3 are combined together by welding a gap between the outer circumferential surface of the shaft portion 15 and the accommodating hole 11 of the base 10. By doing this, the impeller 1 is obtained into which the first impeller part 2 and the second impeller part 3 are integrated.

Figure 8:
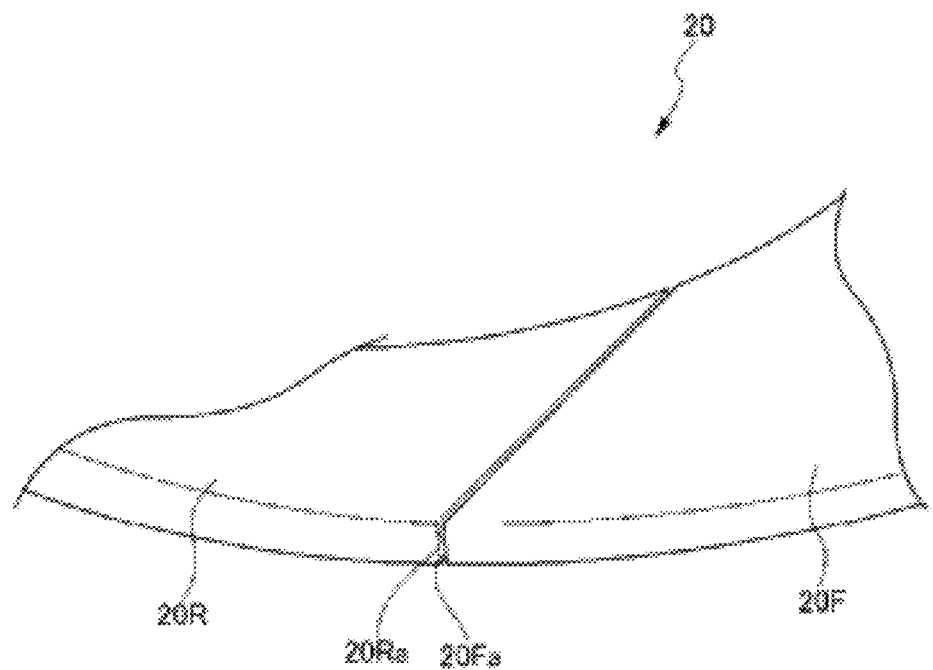
FIG. 8 is an enlarged perspective view showing an example of a butting portion of vanes of the impeller shown in FIG. 3.

In the impeller 1 which is obtained in the way described above, an abutting area between the front vane 20F and the rear vane 20R will be described. For example, as shown in FIG. 8, both the front vane 20F and the rear vane 20R may have abutting surfaces 20Fa, 20Ra which are almost vertical to a surface of the vane 20. In this case, although it is narrow, a gap exists between the abutting surface 20Fa of the front vane 20F and the abutting surface 20Ra of the rear vane 20R. It cannot be denied that the existence of this gap affects badly the flow of a fluid (water) to interrupt the efficiency of the impeller 1 (a pump which includes the impeller).

Figure 9:
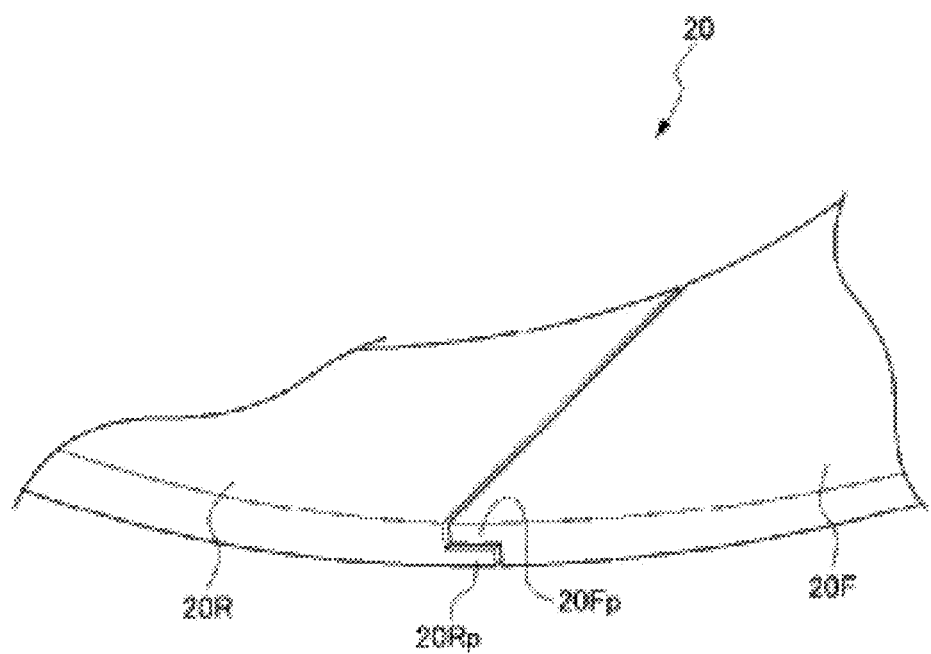
FIG. 9 is an enlarged perspective view showing another example of a butting portion of the vanes of the impeller shown in FIG. 3.

Because of this, for example, as shown in FIG. 9, a configuration may be adopted in which a projecting portion 20Fp is formed at a front edge of an abutting portion of the front vane 20F, and a projecting portion 20Rp is formed at a rear edge of an abutting portion of the rear vane 20R, so that the projecting portion 20Fp and the projecting portion 20Rp overlap each other. It is considered that with this configuration, the possibility that the flow of a fluid (water) is badly affected to interrupt the efficiency of the impeller 1 (the pump which includes the impeller 1) becomes lower than with the configuration shown in FIG. 8.

In either of the cases, however, since it is considered that the effect on the flow of the fluid (water) is small, the configuration shown in FIG. 8, the configuration shown in FIG. 9 or any other arbitrary configuration may be adopted for the abutting area between the front vane 20F and the rear vane 20R.

According to the first embodiment, the following advantages are provided.

(1) Since in the first impeller part 2, all the five front vanes 21F to 25F do not overlap each other when viewed from the front in the direction of the axis, the first impeller part 2 can be molded by using the mold 30 which is made up of the upper mold 31 and the lower mold 32.

(2) In the second impeller part 3, all the five rear vanes 21R to 25R and the base 10 overlap each other when viewed from the front in the direction of the axis. However, the second impeller part 3 can be molded by using the mold 40 which includes the required number (for example, five which is identical with the number of rear vanes 21R to 25R) of slides (inserts) at the overlapping portions in addition to the upper mold 41 and the lower mold 42.

(3) Both the first impeller part 2 and the second impeller part 3 can be molded by the molds, and therefore, the manufacturing costs of the impeller 1 can be reduced.

<Second Embodiment>

Figure 10:
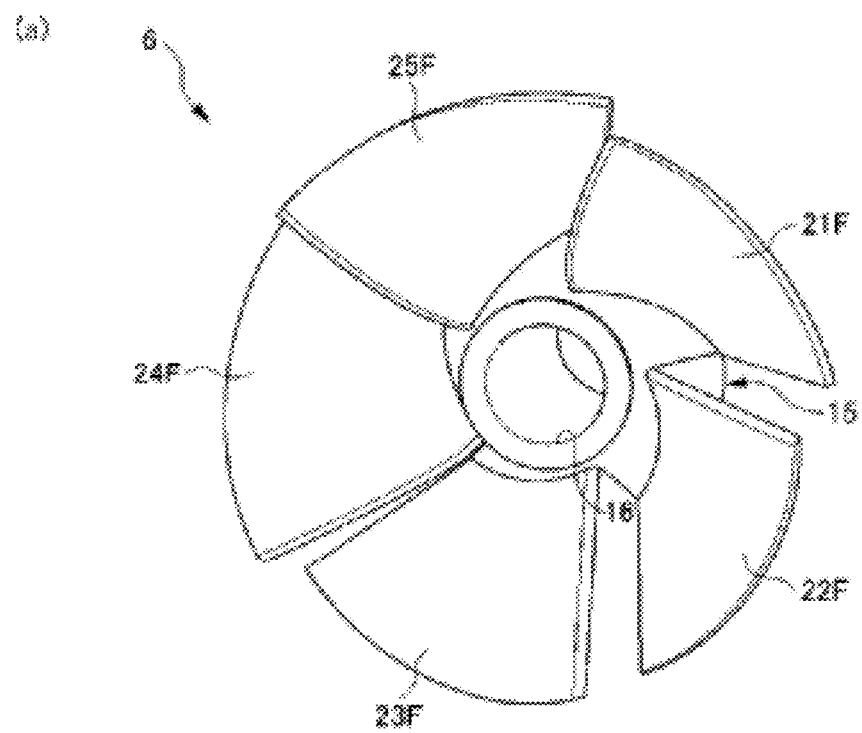
FIG. 10(a) is a perspective view of a first impeller part of an impeller according to a second embodiment as viewed obliquely from a front thereof.
FIG. 10(b) is a perspective view of a second impeller part of the impeller according to the second embodiment as viewed obliquely from a front thereof.
Figure 10:
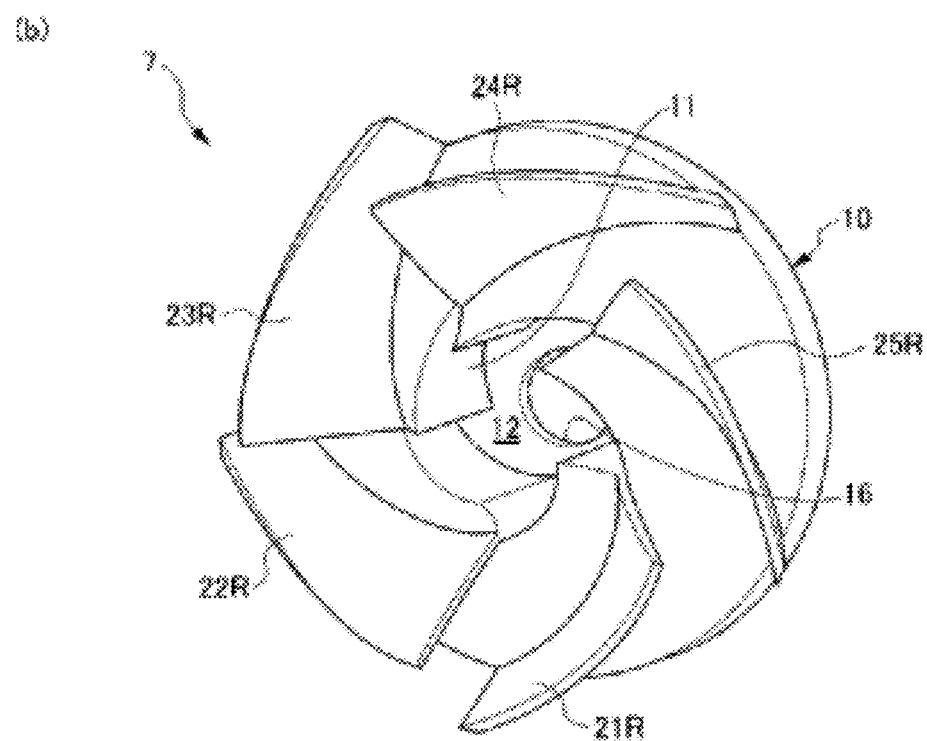
Figure 11:
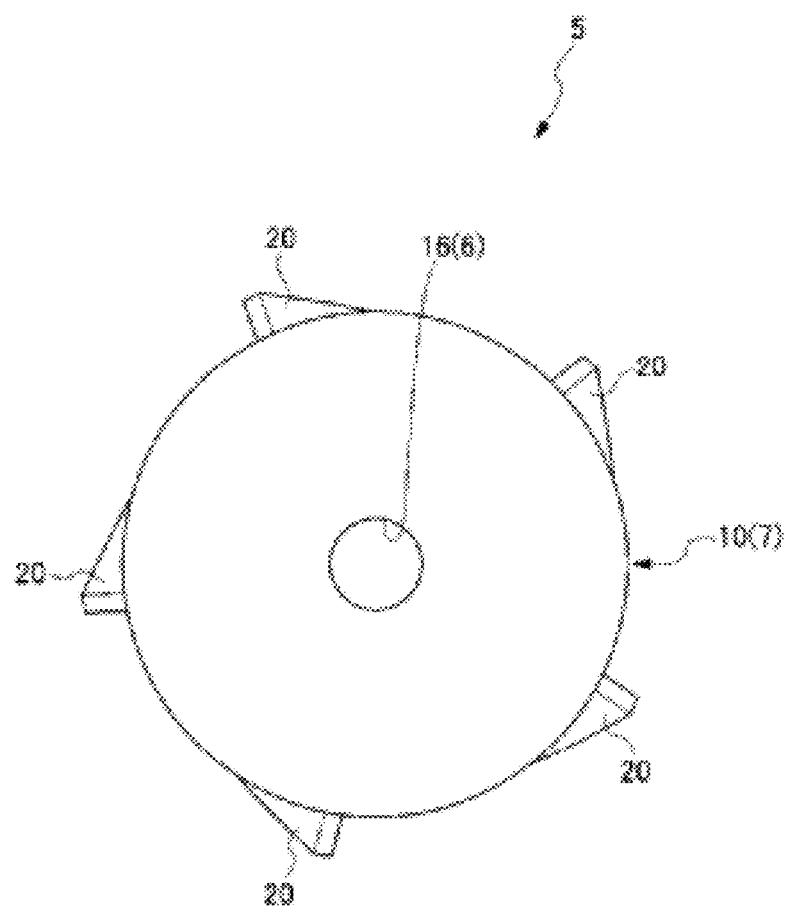
FIG. 11 is a rear view of an impeller which is made by combining the first and second impeller parts shown in FIG. 10 together.
Figure 12:
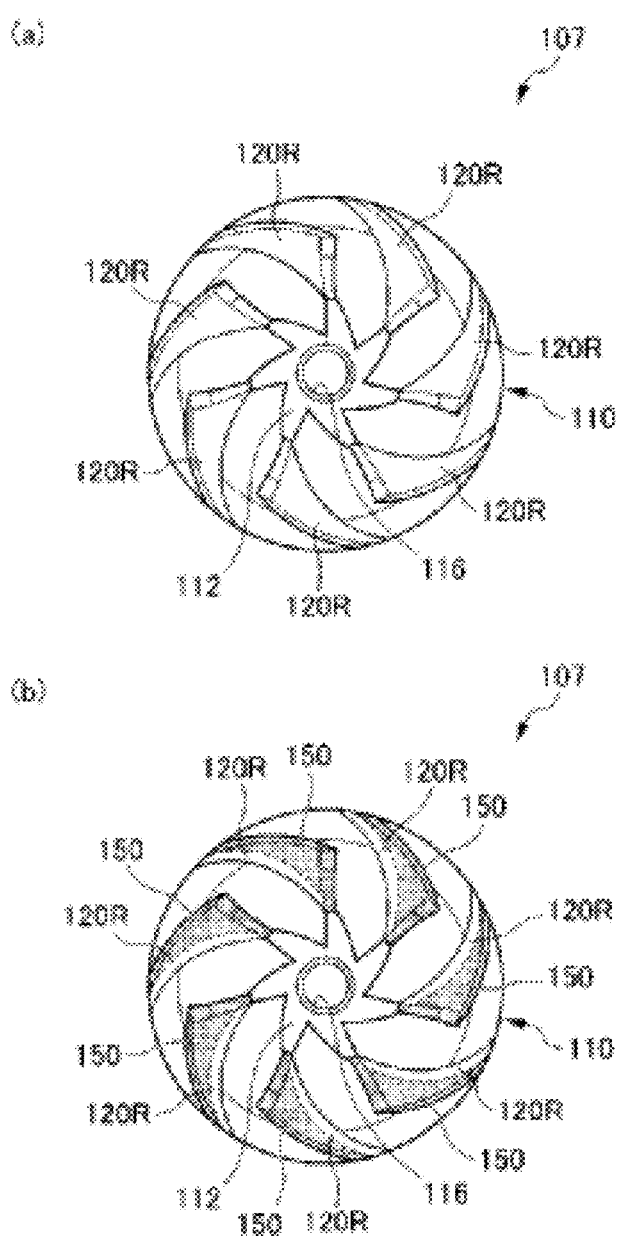
FIG. 12(a) and FIG. 12(b) are plan views of a second impeller part according to a third embodiment as viewed from a front thereof when it is molded.
Figure 13:
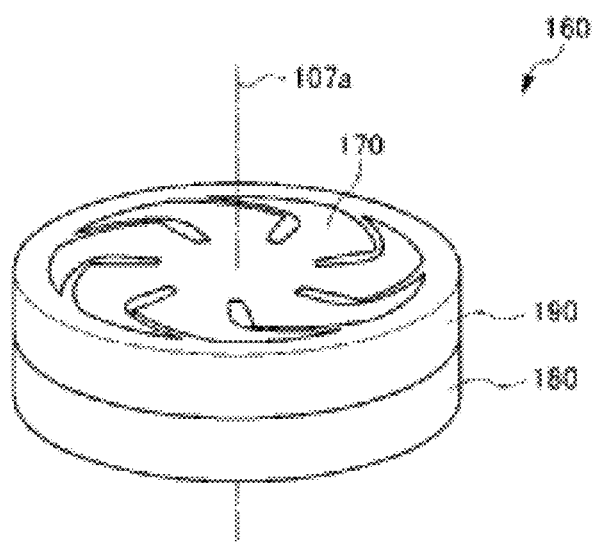
FIG. 13(a) and FIG. 13(b) are perspective views of molds used to the second impeller part shown in FIG. 12.
Figure 13:
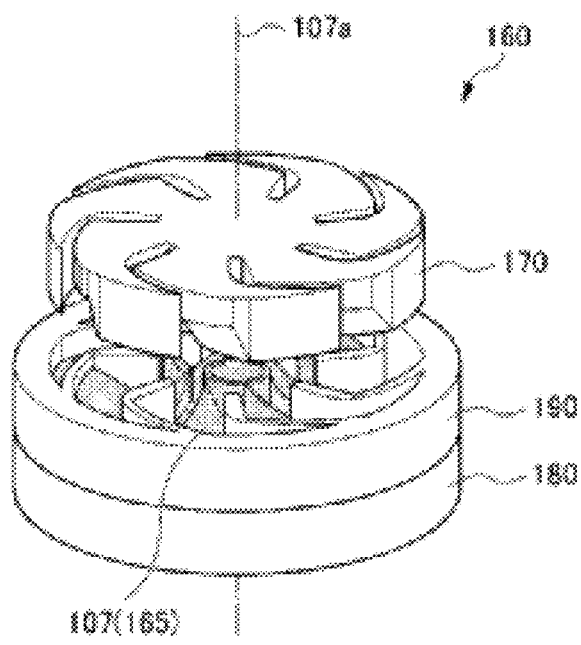
Figure 14:
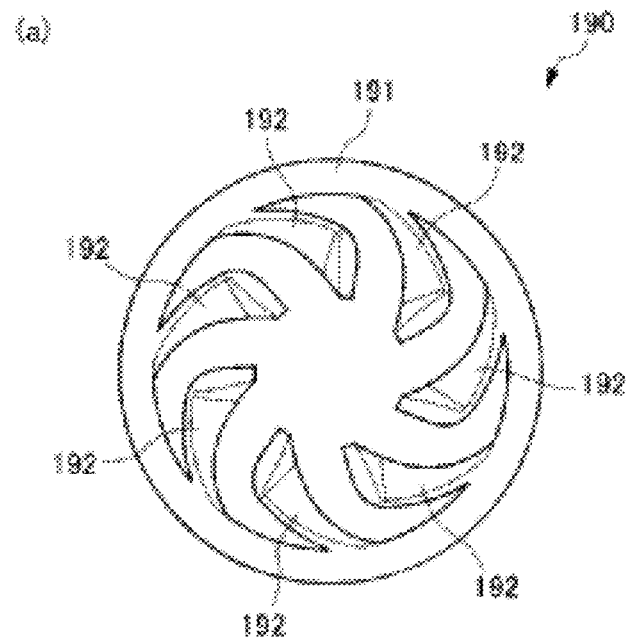
FIG. 14(a) is a plan view of a rotary mold of the molds shown in FIG. 13(a) and FIG. 13(b).
FIG. 14(b) is a perspective view of the rotary mold.
Figure 14:
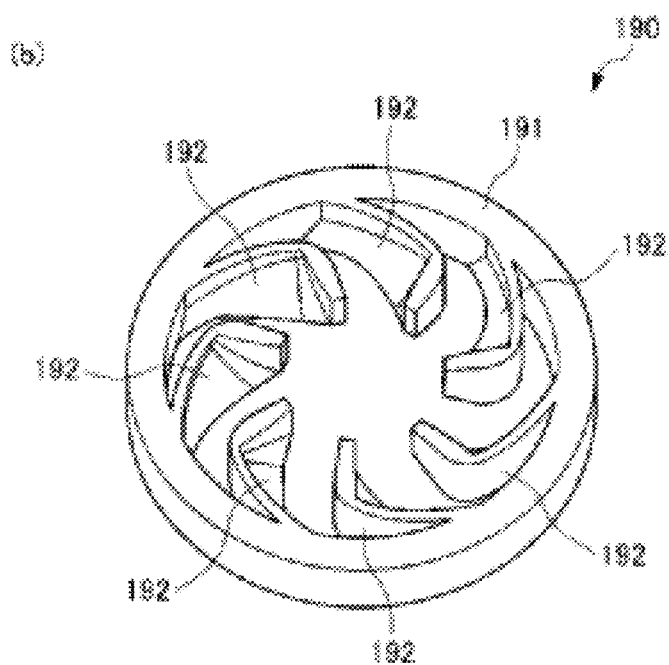
Figure 15:
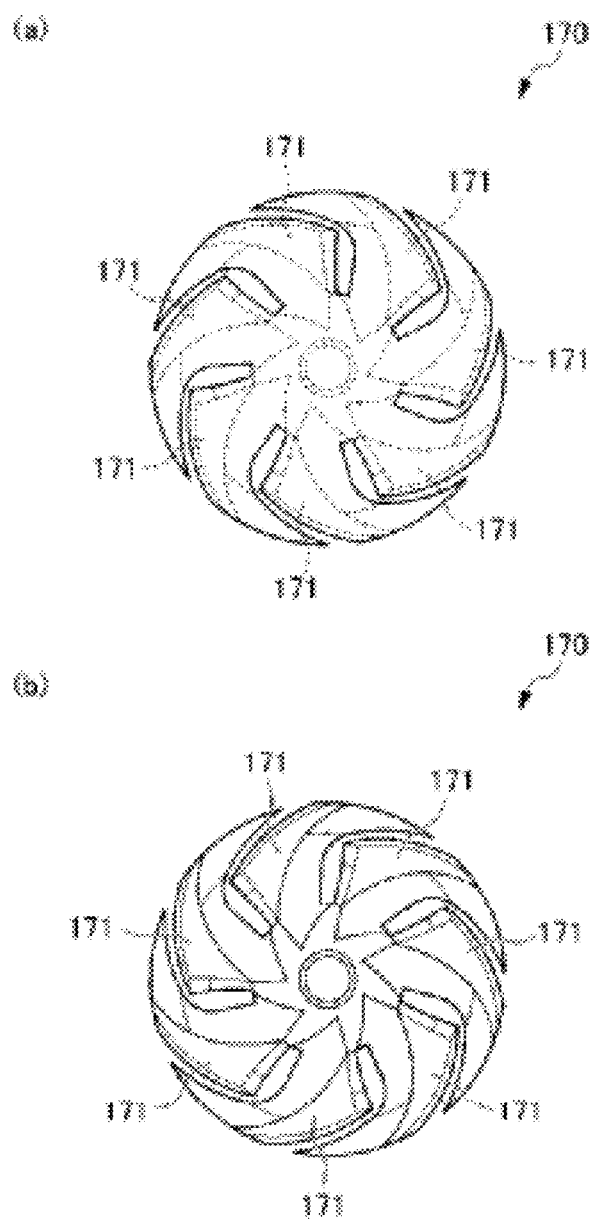
FIG. 15(a) is a plan view of an upper mold of the molds shown in FIG. 13(a) and FIG. 13(b).
FIG. 15(b) is a bottom view of the upper mold.

FIGS. 10(a), 10(b) and 11 are drawings which show an impeller 5 according to a second embodiment and a first impeller part 6 and a second impeller part 7 which make up then impeller 5. The impeller 5, the first impeller part 6 and the second impeller part 7 are almost similar to the impeller 1, the first impeller part 2 and the second impeller part 3 according to the first embodiment. Then, like reference numerals will be given to like portions to those of the first embodiment, and a detailed illustration and description thereof will be omitted here.

A base 10 of the second impeller part 7 has a welding margin 12 formed at a rearmost portion of an accommodating hole 11 which is welded when a shaft portion 15 of the first impeller part 6 is accommodated. The length of the shaft portion 15 of the first impeller part 6 is shortened by such an extent that the welding margin 12 is provided at the rearmost portion of the accommodating hole 11 of the second impeller part 7.

According to the second embodiment, in addition to the advantages (1) to (3) described above, the following advantage is provided.

(4) The base 10 of the second impeller part 7 has the welding margin 12 formed at the rearmost portion of the accommodating hole which is welded when the shaft portion 15 of the first impeller part 6 is accommodated. Consequently, the positioning and welding are facilitated when the shaft portion 15 is accommodated in the accommodating hole 11 in the base 10 to be welded.

<Third Embodiment>

FIGS. 12(a) to 19(b) are drawings which show a second impeller part 107 which makes up an impeller (its illustration being omitted) according to a third embodiment and a mold 160 which molds the second impeller part 107. This impeller includes a first impeller part (its illustration being omitted) and the second impeller part 107, and they are similar, for example, to the impeller 5, the first impeller part 6 and the second impeller part 7 according to the second embodiment, respectively. Because of this, reference numerals which result from adding 100 to the reference numerals used in the second embodiment will be given to like portions to those of the second embodiment, and a repeated description thereof will be omitted here.

When compared with the second impeller part 7 according to the second embodiment shown in FIGS. 10(b) and 11, the second impeller part 107 shown in FIG. 12(a) is different in the following points. In the second impeller part 107, there are provided seven vanes on a rear side (rear vanes) 120R. In the case of the second impeller part 7 according to the second embodiment, there are provided the five rear vanes. In the second impeller part 107, the rear vanes 120R are oriented to be curved counterclockwise from a central end towards an outward tip end thereof. In the case of the second impeller part 7 according to the second embodiment, the rear vanes are curved clockwise. In the second impeller part 107, an outward end portion of the rear vane 120R does not project outwards from an outer circumferential edge of a base 110. In the case of the second impeller part 7 according to the second embodiment, the rear vane 120R projects outwards from the outer circumferential edge of the base 10.

Although not shown, the first impeller part has seven vanes on a front side (front vanes) as with the second impeller part 107, and the front vanes are oriented to be curved counterclockwise from a central end towards an outward tip end thereof. Then, when the first impeller part and the second impeller part 107 are combined together, all the seven front vanes and all the seven rear vanes 120R are positioned adjacent to each other to make up seven complete vanes.

The second impeller part 107 has undercut portions 150. As shown shaded in FIG. 12(b), the undercut portions 150 constitute rear areas of the rear vanes 120R as viewed from the front of the second impeller part 107. Specifically speaking, areas held by rear surfaces of the rear vanes 120R and projected surfaces which are projected onto a front surface of the base 110 by the rear vanes 120R constitute the undercut portions 150. These areas (the undercut portions 150) cannot be molded by an upper mold and a lower mold since portions forwards thereof are interrupted by the rear vanes 120R and portions rearwards thereof are interrupted by the base 110. The third embodiment is characterized in that the undercut portions 150 are molded not by the plurality of slides 43 (43a to 43e) shown in FIGS. 6, 7 but by a single rotary mold 190 which will be described later.

As shown in FIGS. 13(a) and 13(b), the mold 160 which molds the second impeller part 107 includes an upper mold 170 which is a first mold, a lower mold 180 which is a second mold and a rotary mold 190 which is a third mold. A cavity 165 (that is, the second impeller part 107) of the mold 160 is shown shaded in FIG. 13(b). The upper mold 170 has a shape which corresponds to an area which results when the second impeller part 107 is seen from a front side thereof. The lower mold 180 has a shape which corresponds to an area which results when the second impeller part 107 is seen from a rear side thereof. The rotary mold 190 has a shape which corresponds to the undercut portions 150.

As shown in FIGS. 14(a) and 14(b), the rotary mold 190 includes an annular portion 191 which is circumscribed on an outer circumferential edge of the second impeller part 107 and seven projecting portions 192 which project inwards from the annular portion 191 into a shape which corresponds to the undercut portion 150. Namely, each projecting portion 192 corresponds to an area which is held by the rear surface of the rear vane 120R of the second impeller part 107 and a projected surface projected on the front surface of the base 110 by the rear vane 120R therebetween. These seven projecting portions 192 are formed integrally by the annular portion 191. As will be described later, the rotary mold 190 is released by being rotated around a rotating axis 107a of the second impeller part 107.

As shown in FIGS. 15(a) and 15(b), the upper mold 170 has an outer circumferential edge which coincides with the outer circumferential edge of the second impeller part 107 and includes seven rear vane portions 171 which have a shape which corresponds to a front surface of the rear vane 120R of the second impeller part 107. As shown in FIGS. 13(a) and 13(b), the upper mold 170 is fitted in the rotary mold 190 from above (a front side of) the rotary mold 190 along an axis thereof. Then, a closed state is provided by a front surface of the rotary mold 190 and an upper surface of the upper mold 170, and a cavity which corresponds to all shapes formed on a front surface side of the base 110 of the second impeller part 107 which include the undercut portions 150 is formed in an interior of the closed state. The upper mold 170 is moved upwards (towards the front side) along the rotating axis 107a of the second impeller part 107 to thereby be released.

The lower mold 180 has an outer circumferential edge which equals an outer circumference of the annular portion 191 of the rotary mold 190 and has a shape which corresponds to a rear surface side of the base 110 of the second impeller part 107. As shown in FIGS. 13(a) and 13(b), the rotary mold 190 in which the upper mold 170 is fitted is mounted on the lower mold 180. Then, a closed state is provided by the annular portion 191 of the rotary mold 190 and the lower mold 180, and a cavity which corresponds to the shape of the rear surface side of the base portion 110 of the second impeller part 107 is formed in an interior of the closed state. The lower mold 180 is moved downwards (towards a rear side) along the rotating axis 107a of the second impeller part 107 to be released.

Nest, a molding process of the second impeller part 107 which is configured in the way described above will be described. That is, in a first step to a third step of a method for manufacturing impeller according to the third embodiment, the first step or the second step of molding the second impeller part 107 will be described.

Before molding the second impeller part 107, the upper mold 170, the lower mold 180 and the rotary mold 190 are fitted and mounted in a predetermined procedure to prepare the mold 160. As this occurs, the cavity 165 (refer to FIG. 13(b)) which corresponds to the shape of the second impeller part 107 is formed in an interior of the mold 160. For example, a desired plastic material is molded through injection molding by using this mold 160. After molding, the mold 160 is released as described below.

Firstly, as shown in FIG. 13(b), the upper mold 170 is moved towards the front side (upwards) along an axis thereof (that is, the rotating axis 107a of the second impeller part 107 within the cavity 165) to thereby be released.

Figure 16:
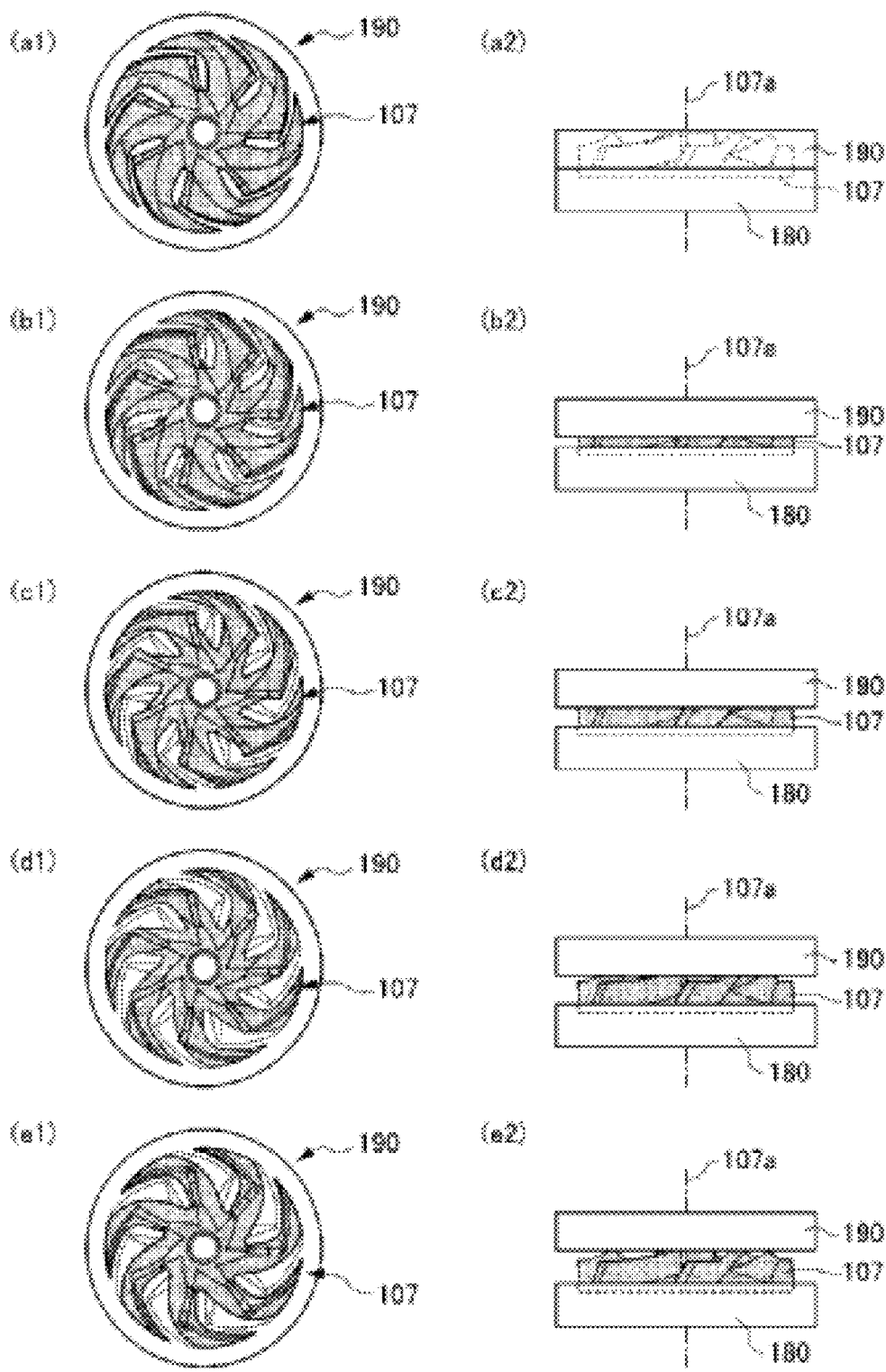
FIG. 16(a1), FIG. 16(b1), FIG. 16(c1), FIG. 16(d1), and FIG. 16(e1) are plan views showing a process of removing the rotary mold.
Figure 17:
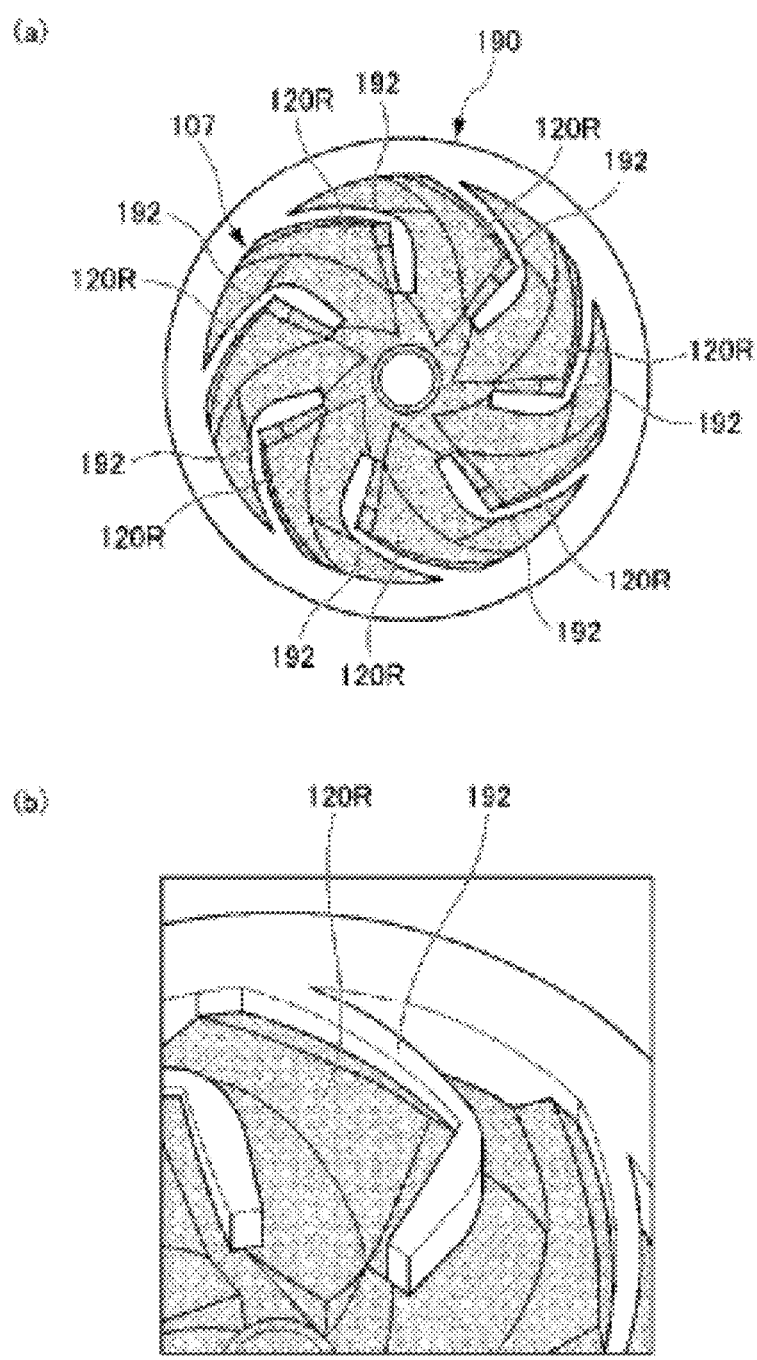
FIG. 17(a) is an enlarged plan view of the rotary mold shown in FIG. 16(a1).
FIG. 17(b) is a partially enlarged plan view of FIG. 17(a).
Figure 18:
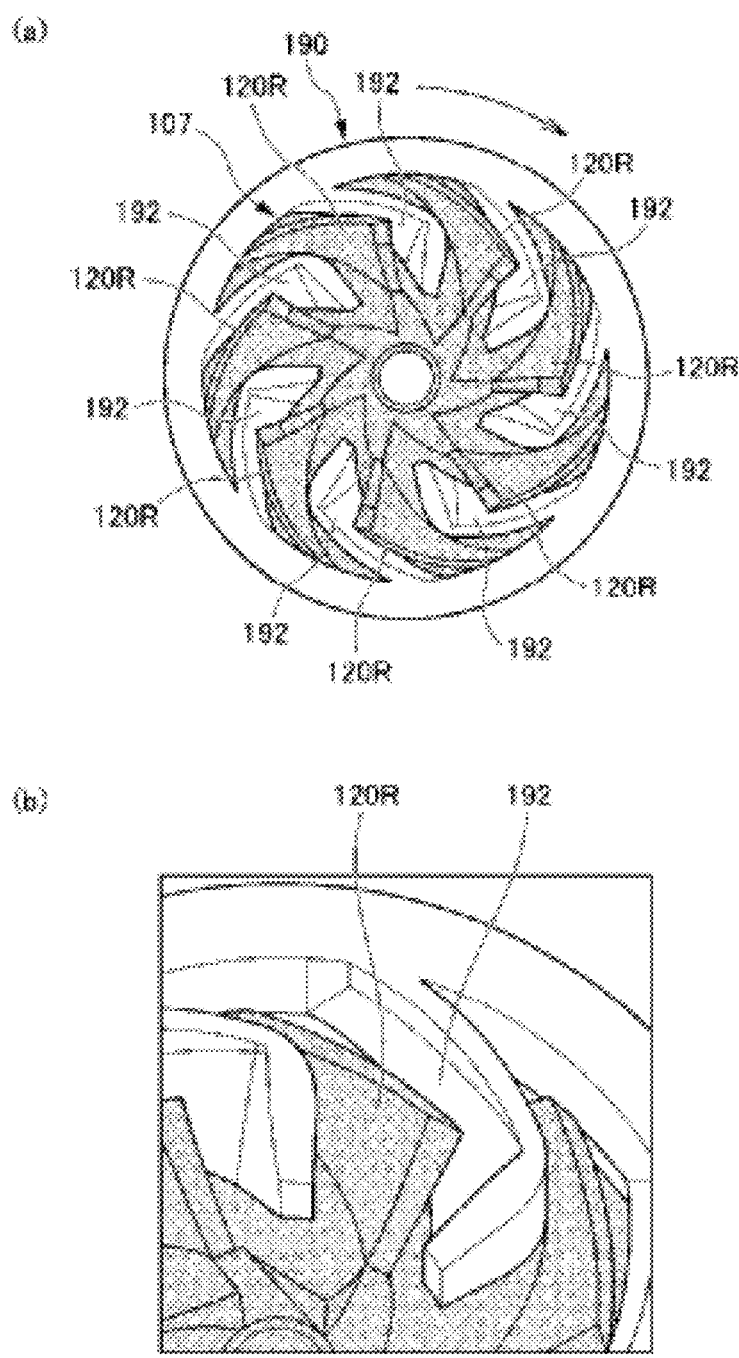
FIG. 18(a) is an enlarged plan view of the rotary mold shown in FIG. 16(c1).
FIG. 18(b) is a partially enlarged plan view of FIG. 18(a).
Figure 19:
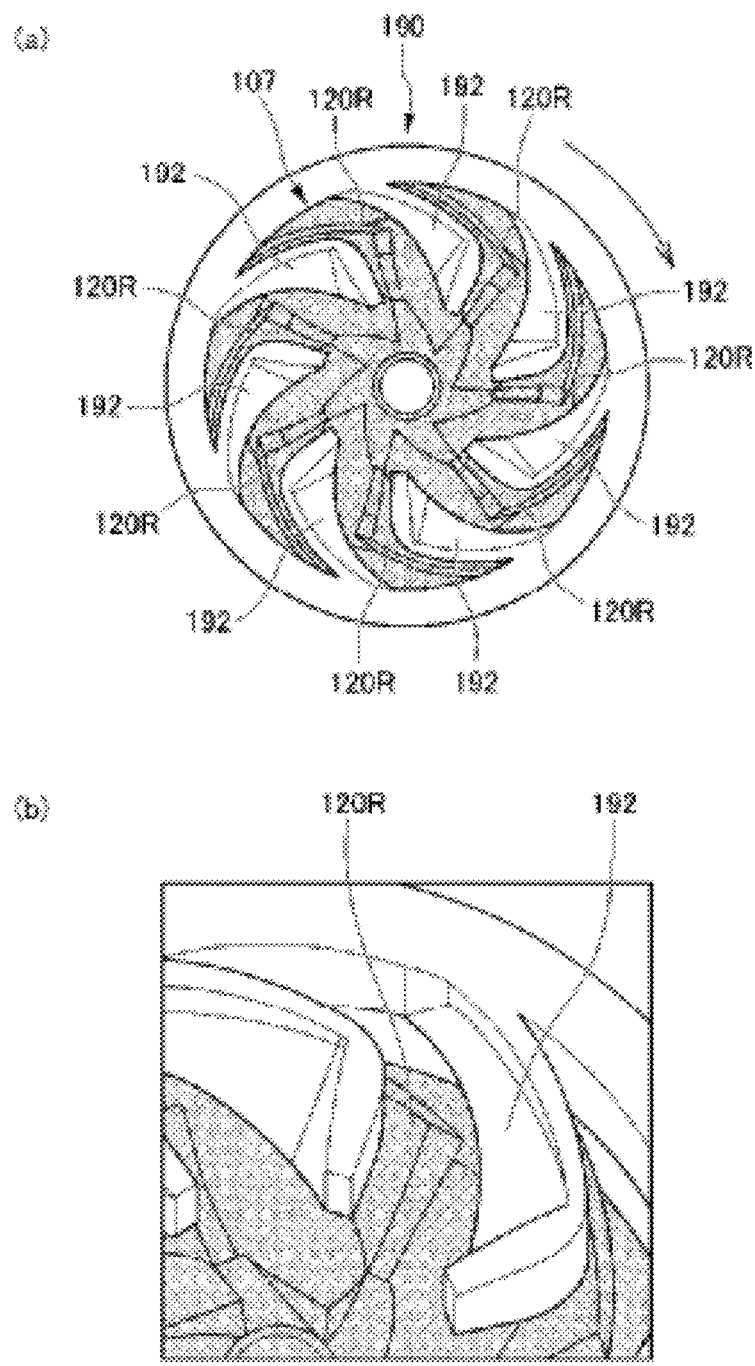
FIG. 19(a) is an enlarged plan view of the rotary mold shown in FIG. 16(e1).
FIG. 19(b) is a partially enlarged plan view of FIG. 19(a).

Next, as shown in FIGS. 16(a) to 19(b), the rotary mold 190 is rotated about an axis thereof (that is, the rotating axis 107a of the second impeller part 107 within the cavity 165) or, more specifically speaking, is moved in the direction of the axis while being rotated about the axis thereof (the rotating axis 107a) to thereby be released. Hereinafter, the release of the rotary mold 190 will be described specifically. In FIGS. 16(a1) to FIG. 19(b), the second impeller 107 is shown as being shaded.

FIGS. 16(a1) and 16(a2) show a state resulting before the rotary mold 190 is rotated, in which FIG. 16(a1) is a plan view, and FIG. 16(a2) is a side view. An enlarged plan view of the rotary mold 190 in this state is shown in FIG. 17(a), and a partially enlarged plan view thereof is shown in FIG. 17(b). As shown in FIGS. 17(a) and 17(b), before the rotary mold 190 is rotated, the projecting portions 192 of the rotary mold 190 are positioned to be in contact with the rear vanes 120R of the second impeller part 107.

When the rotary mold 190 moves in the direction of the axis from this position while rotating slightly (for example, several degrees) around the rotating axis 107a, the projecting portions 192 of the rotary mold 190 deviate in a circumferential direction from the rear vanes 120R of the second impeller part 107 to be displaced (refer to FIG. 16(b1)). At the same time, the rotary mold 190 moves upwards away from the lower mold 180 (refer to FIG. 16(b2)).

Following this, when the rotary mold 190 moves in the direction of the axis while rotating to almost the same extent, the projecting portions 192 of the rotary mold 190 deviate further in the circumferential direction from the rear vanes 120R of the second impeller part 107 (refer to FIG. 16(c1)). At the same time, the rotary mold 190 moves further upwards away from the lower mold 180 (refer to FIG. 16(c2)). An enlarged view of the rotary mold 190 in this state is shown in FIG. 18(a), and a partially enlarged plan view thereof is shown in FIG. 18(b). As shown in FIGS. 18(a) and 18(b), as this occurs, the projecting portions 192 of the rotary mold 190 are positioned to deviate in the circumferential direction from the rear vanes 120R of the second impeller part 107. However, as viewed from the front side (above), the rear vanes 120R partially overlap the projecting portions 192, and therefore, the rotary mold 190 still cannot be released in the direction of the axis in this position.

Following this, when the rotary mold 190 moves in the direction of the axis while rotating to almost the same extent, the projecting portions 192 of the rotary mold 190 deviate further in the circumferential direction from the rear vanes 120R of the second impeller part 107 to be displaced (refer to FIG. 16(d1)). At the same time, the rotary mold 190 moves further upwards away from the lower mold 180 (refer to FIG. 16(d2)).

Following this, when the rotary mold 190 moves in the direction of the axis while rotating to almost the same extent, the projecting portions 192 of the rotary mold 190 deviate further in the circumferential direction from the rear vanes 120R of the second impeller part 107 to be displaced (refer to FIG. 16(e1)). At the same time, the rotary mold 190 moves further upwards away from the lower mold 180 (refer to FIG. 16(e2)). An enlarged view of the rotary mold 190 in this state is shown in FIG. 19(a), and a partially enlarged plan view thereof is shown in FIG. 19(b). As shown in FIGS. 19(a) and 19(b), as this occurs, the projecting portions 192 of the rotary mold 190 are positioned to deviate further in the circumferential direction from the rear vanes 120R of the second impeller part 107. Then, as viewed from the front side (above), the overlapping of the rear vanes 120R with the projecting portions 192 is eliminated. Because of this, when the rotary mold 190 rotates as far as this position, the rotary mold 190 can be drawn (released) in the direction of the axis, whereby the rotary mold 190 is released.

Finally, the lower mold 180 is moved towards the rear side (downwards) along an axis thereof (that is, the rotating axis 107a of the second impeller part 107) to thereby be released.

According to the third embodiment, in addition to the advantages (1) to (4) described above, the following advantages are provided.

(5) The rotary mold 190 is rotated about the axis thereof (that is, the rotating axis 107a of the second impeller part 107) or, more specifically speaking, is moved in the direction of the axis while being rotated about the axis thereof (the rotating axis 107a) to thereby be drawn (released). Because of this, when compared, for example, with the slides 43 (43a to 43e) shown in FIGS. 6, 7, the area occupied by the mold can be reduced, whereby the mold 160 and the molding equipment can be constructed at low cost. Additionally, a multiplicity of impellers tends to be molded easily from the viewpoint of space.

(6) In the rotary mold 190, all the seven projecting portions 192 which correspond to the undercut portions 150 are formed integrally by the annular portion 191. Because of this, the strength of the rotary mold 190 can be ensured relatively easily.

In the third embodiment, while the rotary mold 190 is moved in the direction of the axis while being rotated about the axis thereof (that is, the rotating axis 107a of the second impeller part 107) to thereby be drawn (released), the invention is not limited thereto. For example, the rotary mold 190 is rotated through a required angle to a releasable position without being moved in the direction of the axis, whereafter the rotary mold 190 may be released in a similar way to the way in which the upper mold 170 or the lower mold 180 is released.

Additionally, as to the dividing position where the vanes 21 to 25 are divided into the front vanes 21F to 25F and the rear vanes 21R to 25R, in the first and second embodiments, while the vanes 21 to 25 are so divided in the position where all the five front vanes 21F to 25F do not overlap each other as viewed from the front in the direction of the axis, the invention is not limited thereto. For example, the vanes 21 to 25 may be divided in a positional relationship in which the front vane 21F is partially hidden behind the front vane 22F.

As this occurs, as in the case with molding the second impeller parts 3, 7, the first impeller parts 2, 6 can also be molded by using the mold 30 (its illustration being omitted) which includes the required number (for example, five which is identical with the number of front vanes 21F to 25F) of slides (their illustration being omitted) at the overlapping portions in addition to the upper mold 31 and the lower mold 32. In addition, the first impeller parts 2, 6 can also be molded by using the rotary mold 190 used in the third embodiment in place of the slides.

In addition, in the first and second embodiments, while the number of vanes of the impellers 1, 5 is five, the invention is not limited thereto. An arbitrary number of vanes can be selected as required for the impellers 1, 5.

In the first and second embodiments, while the first impeller parts 2, 6 and the second impeller parts 3, 7 are molded by injection molding the plastic materials using the molds 30, 40, the invention is not limited thereto. For example, the first impeller parts 2, 6 and the second impeller parts 3, 7 may be molded through die casting of an aluminum alloy. As this occurs, the combination of the first impeller parts 2, 6 and the second impeller parts 2, 7 which are molded through die casting can be executed through joining, fastening or the like. This will be true with the third embodiment.

<Fourth Embodiment>

Figure 20:
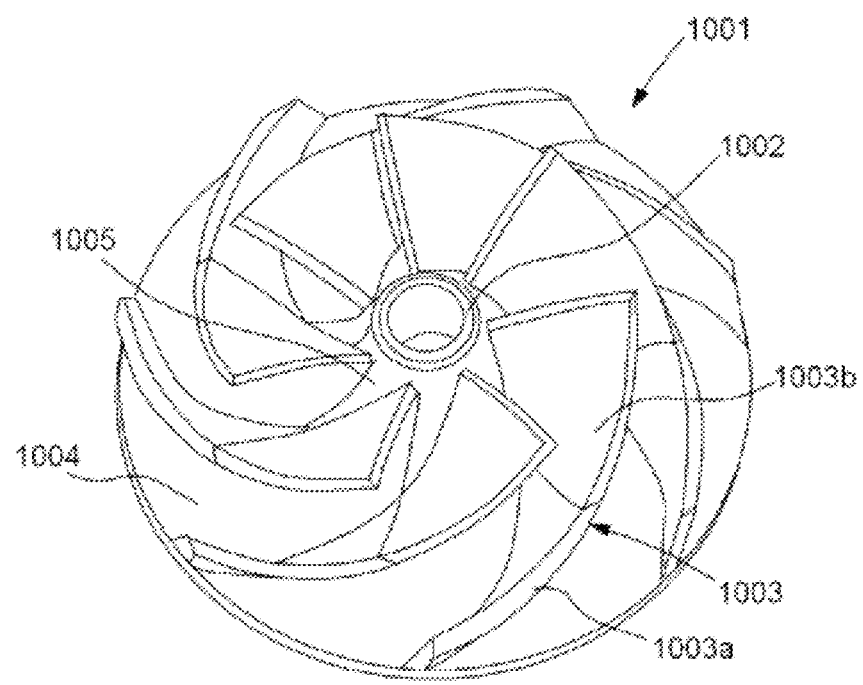
FIG. 20 is a perspective view showing an impeller of a fourth embodiment.
Figure 21:
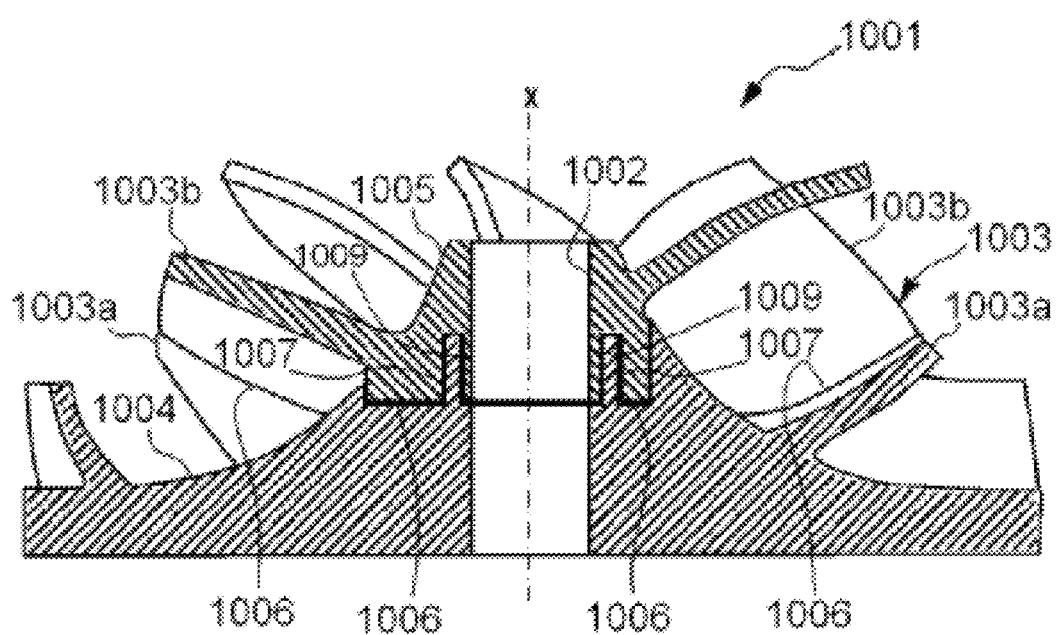
FIG. 21 is an explanatory sectional view of the impeller of the fourth embodiment.

FIGS. 20 to 24 are in relation to a fourth embodiment. An impeller 1001 which is a rotary member of the fourth embodiment includes, as shown in FIGS. 20 and 21, a shaft inserting portion 1002 which penetrates vertically and a plurality of vanes 1003 which extend radially from the shaft inserting portion 1002. The shaft inserting portion 1002 functions as a rotating axis of the impeller 1001, and a rotating drive shaft, not shown, can be inserted thereinto along an axis x thereof. The individual vanes 1003 are provided at predetermined intervals in the direction of an outer circumference of the shaft inserting portion 1002. Further, the vanes 1003 each have a shape in which the vane 1003 is inclined and curved with respect to the axis x of the shaft inserting portion 1002 (which is the same axis as an axis of the rotating drive shaft) and when viewed from the top, the vanes 1003 are formed into a shape in which the adjacent vanes partially overlap each other.

As shown in FIG. 21, the impeller 1001 of the fourth embodiment is made up of a second impeller member 1004 which makes up a lower half portion and a first impeller member 1005 which makes up an upper half portion, and boundary planes where the second impeller member 1004 and the first impeller member 1005 contact constitute dividing planes 1006 when the impeller 1001 is divided in the direction of the axis x of the shaft inserting portion 1002.

Figure 22:
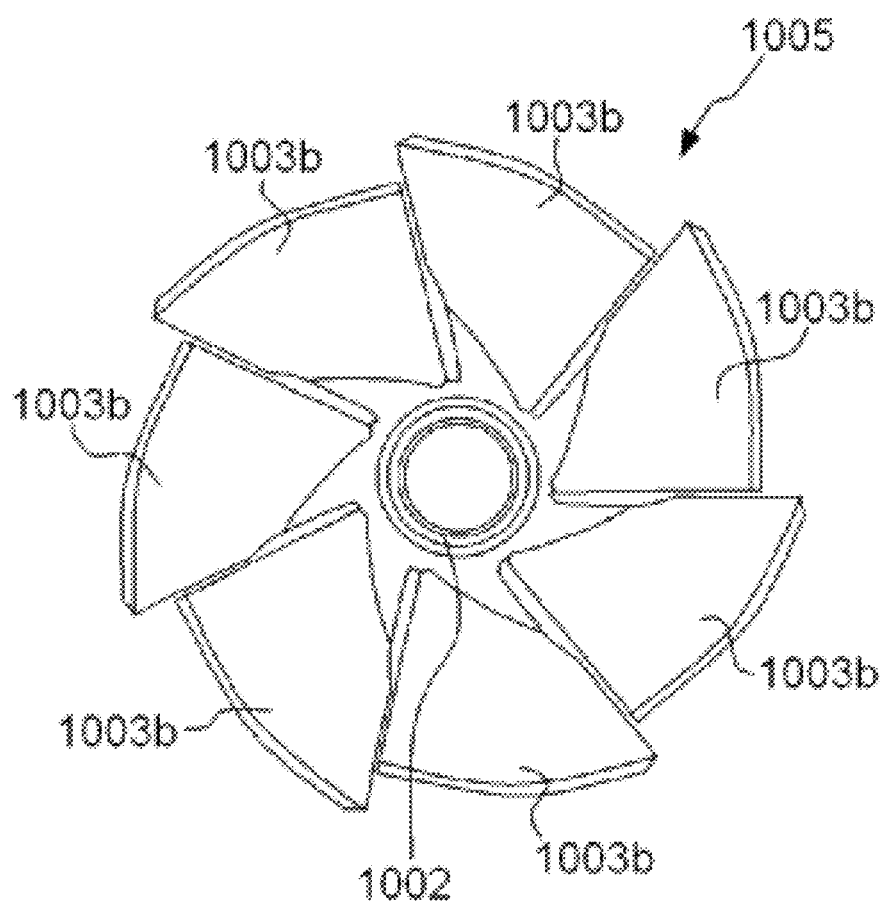
FIG. 22 is a plan view of a first impeller member of the fourth embodiment.

As shown in FIG. 22, when viewed from the top, the first impeller member 1005 which makes up the upper half portion has a shape in which adjacent vanes 1003b do not overlap each other vertically. Referring to FIG. 20, when viewed from the top, the second impeller member 1004 which makes up the lower half portion also has a shape in which adjacent vanes 1003a do not overlap each other vertically.

Additionally, when the second impeller member 1004 and the first impeller member 1005 are connected together so that the dividing planes 1006 abut each other, as shown in FIG. 20, the vanes 1003 as the impeller 1001 are formed by the vanes 1003a of the second impeller member 1004 and the vanes 1003b of the first impeller member. When viewed from the top in this state, the vanes 1003b of the first impeller member 1005 partially overlap a part of the vanes 1003a of the second impeller member 1004 from thereabove.

Figure 23:
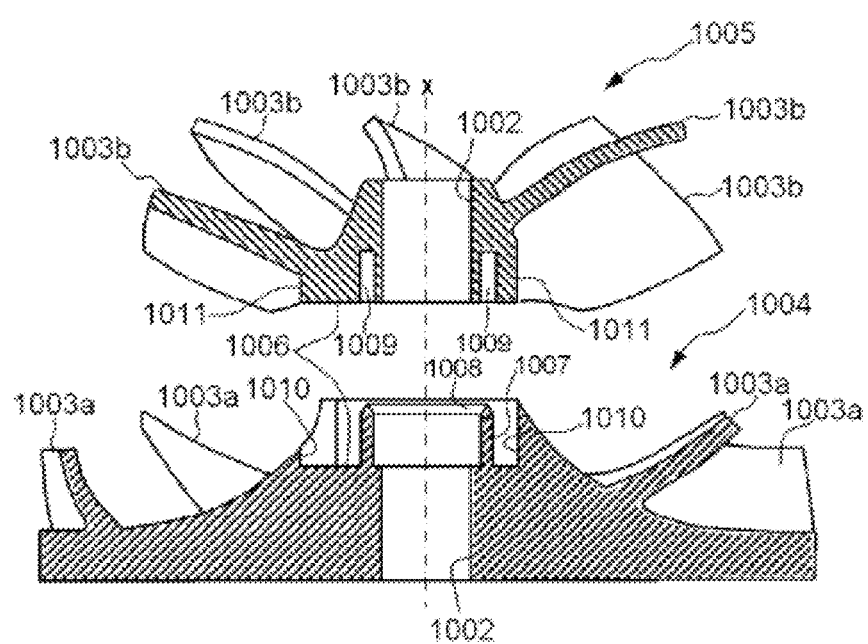
FIG. 23 is an explanatory sectional view showing the impeller of the fourth embodiment in an exploded fashion.

As shown in FIG. 23, the second impeller member 1004 includes a projecting portion 1007 which projects upwards from the dividing plane 1006. The projecting portion 1007 is formed in a position which lies adjacent to the shaft inserting portion 1002 and is formed into a cylinder which is a ring which is concentric with the shaft inserting portion 1002. Additionally, a distal end of the projecting portion 1007 has a pointed shape in which the distal end is inclined upwards in such directions that an inner circumferential surface and an outer circumferential surface intersect each other. The first impeller member 1005 has a recess portion 1009 which is recessed from the dividing plane 1006. The recess portion 1009 corresponds to the projecting portion 1007 of the second impeller member 1004 so that the projecting portion 1007 can be inserted into the recess portion 1009 to be received therein. It is noted that a vertical wall surface 1010 which is erected on an outer side of the projecting portion 1007 of the second impeller member 1004 and an outer circumferential surface 1011 of the recess portion 1009 of the first impeller member 1005 correspond to each other and form an irregular shape which functions to prevent a relative rotation between the second impeller member 1004 and the first impeller member 1005.

Figure 24:
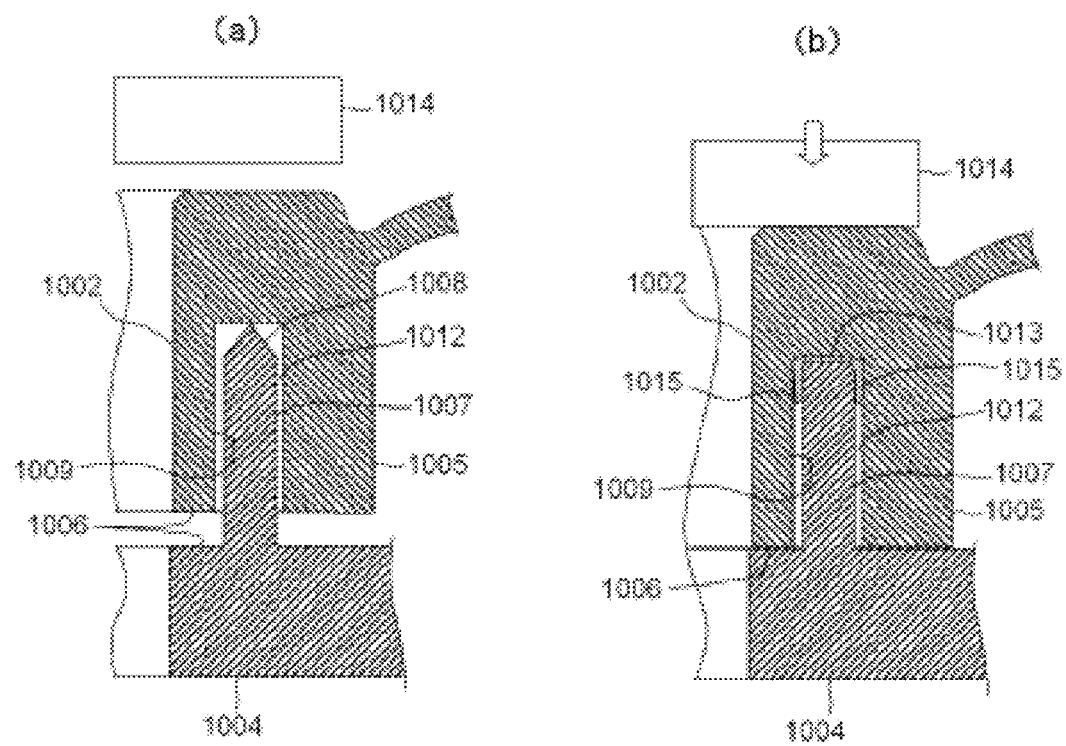
FIG. 24(a) and FIG. 24(b) are explanatory sectional views of a main part of the impeller showing a joining process of the fourth embodiment.

As shown in FIG. 24(*a*), the recess portion 1009 is sized so that a slight void 1012 is generated around a circumference of the projecting portion 1007 when the recess portion 1009 receives the projecting portion 1007 therein. Additionally, a depth dimension of the recess portion 1009 is formed smaller slightly (by an amount equal to the height of an inclined portion 1008 at the distal end of the projecting portion 1007) than a lengthwise dimension of the projecting portion 1007 in the direction of the height thereof. Additionally, although will be described in detail later, as shown in FIG. 24(*b*), a joint portion 1013 is formed at a contact portion between the distal end of the projecting portion 1007 and a deep end (an upper end face in the figure) of the recess portion 1009, whereby the second impeller member 1004 and the first impeller member 1005 are connected together integrally into the impeller 1001.

Next, a manufacturing method of the impeller 1001 according to the fourth embodiment will be described. The second impeller member 1004 and the first impeller member 1005 are formed separately of a thermoplastic material through injection molding. As has been described before, both the second impeller member 1004 and the first impeller member 1005 are formed into a shape in which the adjacent vanes 1003a do not overlap each other and the adjacent vanes 1003b do not overlap each other when viewed from the top. By forming the first and second impeller members into that shape, the second impeller member 1004 and the first impeller member 1005 each have a good releasability from a mold which is used when they are molded through injection molding, and since this can prevent a complex mold configuration, the second impeller member 1004 and the first impeller member 1005 can be molded at low cost.

Referring to FIG. 23, the first impeller member 1005 which is formed separately is assembled to the second impeller member 1004 which is also formed separately (an assembling step). As this occurs, the projecting portion 1007 of the second impeller member 1004 is inserted into the recess portion 1009 of the first impeller member 1005. By doing so, as shown in FIG. 24(*a*), the distal end of the projecting portion 1007 of the second impeller member 1004 is brought into abutment with the deep end of the recess portion 1009 of the first impeller member 1005. At this point in time, since the lengthwise dimension of the projecting portion 1007 is larger than the depth dimension of the recess portion 1009, the dividing planes 1006 of the second impeller member 1004 and the first impeller member 1005 are not attached closely to each other.

Following this, as shown in FIG. 24(*b*), an ultrasonic oscillating portion 1014 of an ultrasonic welding device is placed opposite to the distal end of the projecting portion 1007 from an upper surface (an opposite side of the dividing plane 1006) of the first impeller member 1005 to be brought into abutment therewith, whereby vibration energy by ultrasonic waves is imparted thereto (a joining step). When vibration energy reaches the abutment position between the distal end of the projecting portion 1007 of the second impeller member 1004 and the deep end of the recess portion 1009 of the first impeller member 1005, frictional heat associated with vibration is generated at a contact portion between the distal end of the projecting portion 1007 and the deep end of the recess portion 1009, whereby the distal end of the projecting portion 1007 of the second impeller member 1004 and the deep end of the recess portion 1009 of the first impeller member 1005 are fused to thereby form the joint portion 1013.

Then, since a transmission distance of vibration energy becomes relatively short as a result of the projecting portion 1007 being provided on the second impeller member 1004 and the recess portion 1009 being provided in the first impeller member 1005, the distal end of the projecting portion 1007 and the deep end of the recess portion 1009 are joined together strongly and rigidly. Consequently, a high joining strength can be obtained, whereby the highly strong impeller 1001 can be obtained in which the second impeller 1004 and the first impeller 1005 are connected strongly and rigidly.

In addition, as shown in FIG. 24(*b*), when the joint portion 1013 is formed, the projecting portion 1007 of the second impeller member 1004 is fused, whereby the overall length of the projecting portion 1007 in the direction of the height thereof is shortened. This brings the dividing planes 1006 of the second impeller member 1004 and the first impeller member 1005 into close attachment to each other, whereby the projecting portion 1007 is accommodated within the recess portion 1009.

Further, as this occurs, burrs 1015 are generated as a result of the projecting portion 1007 of the second impeller member 1004 being fused. Although the burrs 1015 intrude into the void 1012 defined between the projecting portion 1007 and the recess portion 1009, the recess portion 1009 is closed by the dividing plane 1006 of the second impeller member 1004. This seals the burrs 1015 in an interior of the recess portion 1009, and there is caused no such situation that the burrs 1015 are exposed on an external surface of the impeller 1001, which obviates the necessity of deburring work.

In the fourth embodiment, while the manufacturing method of the impeller 1001 has been described, the manufacturing method of the invention can easily be applied to any rotary member with a rotating shaft other than the impeller 1001 such as a sirocco fan, a turbo fan or the like, for example.

In addition, in the fourth embodiment, while the thermoplastic material is described as being used as the material of the impeller 1001, the invention is not limited thereto. For example, the invention can also be adopted even when a metal such as an aluminum alloy or the like is used as the material of the impeller 1001.

According to the individual embodiments described above, the manufacturing method of the impeller in which the plurality of vanes are provided so as to overlap each other back and forth as viewed in the direction of the axis may include the first step of molding the first impeller part (2, 6, 1005) of the two divided parts of the first impeller part (2, 6, 1005) and the second impeller part (3, 7, 107, 1004) which result when the impeller is divided so that the individual vanes are divided into the front side and the rear side as viewed in the direction of the axis, the second step of molding the second impeller part (3, 7, 107, 1004), and the third step of combining together the first impeller part (2, 6, 1005) and the second impeller part (3, 7, 107, 1004) into the impeller (1, 5, 1001).

According to this manufacturing method, in either of the first step and the second step, by using the mold having the configuration in which the relatively simple slides (inserts) are added as required to the upper mold and the lower mold, the first impeller part and the second impeller part can be molded. Consequently, the first and second impeller parts can be molded by using the mold, thereby making it possible to fabricate the impeller at low cost.

The first impeller part (2, 6, 1005) may have the front vanes (21F to 25F, 1003*b*). The front vanes (21F to 25F, 1003*b*) may not overlap each other as viewed in the direction of the axis.

According to this manufacturing method, the mold which molds the first impeller part can be made up of the upper mold and the lower mold. Consequently, the first impeller part can be molded by using the mold having the simpler configuration, thereby making it possible to fabricate the impeller at lower cost.

The second impeller part (107) may have the rear vanes (120R) and may also have the undercut portions (150). The second impeller part (107) may be molded by using the first mold (170), the second mold (180) and the third mold (190) which corresponds to the undercut portions (150). The third mold (190) may be released by being rotated about the rotating axis (107*a*) of the second impeller part (107).

According to this manufacturing method, the third mold can be released by being rotated about the rotating axis of the second impeller part. Because of this, compared with the mold using the slides, the area occupied by the mold can be reduced, whereby it is possible to make the mold and the molding equipment inexpensive. Additionally, a multiplicity of impellers tends to be molded easily from the viewpoint of space.

The third mold (190) may be released by being moved in the direction of the axis while being rotated about the rotating axis (107*a*) of the second impeller part (107).

According to this manufacturing method, too, compared with the mold using the slides, the area occupied by the mold can be reduced, whereby it is possible to make the mold and the molding equipment inexpensive. Additionally, a multiplicity of impellers tends to be molded easily from the viewpoint of space.

In addition, according to the individual embodiments described above, the manufacturing method of the impeller which includes the first impeller member (1005) and the second impeller member (1004) which are divided into the direction of the axis via the dividing planes (1006) may include the step of inserting the projecting portion (1007) which is provided so as to project in the direction of the axis from the dividing plane (1006) of the second impeller member (1004) into the recess portion (1009) which is formed in the dividing plane (1006) of the first impeller member (1005) and the step of joining together the distal end of the projecting portion (1007) and the deep end of the recess portion (1009) by imparting the vibration energy to the distal end of the projecting portion (1007) of the second impeller member (1004) from the opposite side via the first impeller member (1005).

According to this manufacturing method, since the first impeller member and the second impeller member which are divided in the direction of the axis are joined together, it is possible to fabricate the rotary member efficiently and inexpensively. In addition, the vibration energy is used to join the first impeller member and the second impeller member together. The joining with the vibration energy can easily be executed by using, for example, the vibration energy imparting means such as the joining means using ultrasonic waves.

Incidentally, the joining using vibration energy imparted by the vibration energy imparting means such as the joining means using ultrasonic waves is such that vibration energy is transmitted to the predetermined joining position where the first impeller member contacts the second impeller member so that the frictional heat is generated locally to thereby execute the fusion joining. Because of this, the shorter the transmission distance of the vibration energy becomes, the higher the joining strength can be obtained.

Because of this, the distal end of the projecting portion (1007) and the deep end of the recess portion (1009) may be joined together by imparting the vibration energy to the distal end of the projecting portion (1007) of the second impeller member (1004) from the opposite side thereto via the first impeller member (1005). As this occurs, although the vibration energy is imparted from an end face of the first impeller member, since the contact portions of the distal end of the projecting portion and the deep end of the recess portion are joined together, the transmission distance of the vibration energy becomes shorter than the distance to the dividing planes. This enables the distal end of the projecting portion and the deep end of the recess portion to be joined strongly and rigidly by the vibration energy. Consequently, the high joining strength is obtained, thereby making it possible to obtain the highly strong rotary member.

The projecting portion (1007) may be formed into the ring which is concentric with the rotating axis (X) of the impeller. According to this configuration, the joining portion is formed so as to be near and surround the rotating axis by the distal end of the projecting portion and the deep end of the recess portion. Consequently, the stress concentration or the influence of the centrifugal force to the joining portion when the impeller is rotated can be reduced, thereby making it possible to maintain the strong joined state between the first impeller member and the second impeller member.

In addition, the projecting portion (1007) which is joined to the deep end of the recess portion at the distal end thereof may be accommodated within the recess portion (1009) which is closed by the dividing plane (1006) of the second impeller member (1004). According to this configuration, even though burrs are generated in the joining portion between the distal end of the projecting portion and the deep end of the recess portion, the burrs generated then are sealed in the recess portion and can be prevented from being exposed to an external surface of the rotary member. Consequently, the deburring work or the like is made unnecessary, thereby making it possible to improve the manufacturing efficiency.

The dividing planes (1006) may be set so that the individual vanes of the first impeller member (1005) overlap at least partially the front sides of the individual vanes of the second impeller member (1004) when the first impeller member (1005) and the second impeller (1004) are combined together.

According to this manufacturing method, the individual vanes of the second impeller member which is molded through injection molding can be molded relatively large, and this can provide the good releasability and simplify the shape of the mold, thereby making it possible to reduce the manufacturing cost. On the other hand, as has been described before, the energy transmission distance to the joining position where the distal end of the projecting portion and the deep end of the recess portion are joined together becomes shorter than to the dividing planes, and this can ensure the proper joining of the two portions. Consequently, it is possible to obtain the inexpensive and highly strong impeller.

In addition, according to the individual embodiments described above, the impeller (1001) which is formed by joining together the first impeller member (1005) and the second impeller member (1004) which are divided in the direction of the axis via the predetermined dividing planes (1006) may include the recess portion (1009) which is formed in the dividing plane (1006) of the first impeller member (1005), the projecting portion (1007) which projects from the dividing plane (1006) of the second impeller member (1004), which is formed into the ring shape which is concentric with the rotating axis (X) and which is inserted into the recess portion (1009) and the joining portion where the distal end of the projecting portion (1007) and the deep end of the recess portion (1009) are joined together.

According to this construction, the joining portion between the first impeller member and the second impeller member is formed by the distal end of the ring-shaped projecting portion which is provided in the vicinity of the rotating axis to project therefrom and which is concentric with the rotating axis being joined to the deep end of the recess portion. By adopting this configuration, it is possible to provide the highly strong impeller in which the concentration of stress or the influence of centrifugal force on the joining portion which would occur when the impeller is rotated can be reduced.

In addition, in the construction described above, the projecting portion (1007) may be accommodated within the recess portion (1009) which is closed by the dividing plane (1006). According to this construction, since the joining portion between the distal end of the projecting portion and the deep end of the recess portion is sealed in the interior of the recess portion, there is caused no such situation that burrs or the like are exposed from the external surface of the impeller, thereby making it possible to provide the impeller with high rotating accuracy.

The invention claim is:

1. A method for manufacturing an impeller which is provided so that a plurality of vanes overlap each other back and forth as viewed in a direction of a rotating axis of the impeller, comprising:
    a step of molding a first impeller part which is one of two parts into which the impeller is divided so that each of the plurality of vanes is divided into a front side and a rear side as viewed in the direction of the rotating axis of the impeller;
    a step of molding a second impeller part which is the other of the two parts into which the impeller is divided; and
    a step of combining together the first impeller part and the second impeller part into the impeller,
    wherein
    the second impeller part has the plurality of vanes on the rear side and an undercut portion,
    the second impeller part is molded by using a first mold, a second mold and a third mold having a shape which corresponds to the undercut portion, and
    the third mold is released by being rotated about a rotating axis of the second impeller part.

2. The method according to claim 1, wherein
    the first impeller part has the plurality of vanes on the front side, and
    the plurality of vanes on the front side do not overlap each other as viewed in the direction of the rotating axis of the impeller.

3. The method according to claim 1, wherein
    the third mold is released by being moved in the direction of the rotating axis of the impeller while being rotated about the rotating axis of the second impeller part.

4. The method according to claim 3, wherein
    the first impeller part has the plurality of vanes on the front side, and
    the plurality of vanes on the front side do not overlap each other as viewed in the direction of the rotating axis of the impeller.

5. A method for manufacturing an impeller which is provided so that a plurality of vanes overlap each other back and forth as viewed in a direction of a rotating axis of the impeller, comprising:
    a step of molding a first impeller part which is one of two parts into which the impeller is divided so that each of the plurality of vanes is divided into a front side and a rear side as viewed in the direction of the rotating axis of the impeller;
    a step of molding a second impeller part which is the other of the two parts; and a step of combining together the first impeller part and the second impeller part into the impeller, wherein the impeller is divided into the first impeller part and the second impeller part, which are divided in the direction of the rotating axis of the impeller via dividing planes of the first impeller part and the second impeller part, and wherein the method for manufacturing impeller comprises further:

a step of inserting a projecting portion of the second impeller part, which is provided to project from the dividing plane of the second impeller part in the direction of the rotating axis of the impeller, into a recess portion of the first impeller part, which is formed in the dividing plane of the first impeller part; and a step of joining a distal end of the projecting portion of the second impeller part and a deep end of the recess portion of the first impeller part together by imparting vibration energy to the distal end of the projecting portion of the second impeller part from an opposite side thereto via the first impeller part.

6. The method according to claim 5, wherein
the projecting portion of the second impeller part is formed into a ring shape which is concentric with the rotating axis of the impeller.

7. The method according to claim 6, wherein
the projecting portion of the second impeller part, which is joined to the deep end of the recess portion of the first impeller part at the distal end thereof, is accommodated within the recess portion of the first impeller part which is closed by the dividing plane of the second impeller part.

8. The method according to claim 6, wherein
the dividing planes of the first impeller part and the second impeller part are set so that vanes of the first impeller part overlap at least partially front sides of vanes of the second impeller part when the first impeller part and the second impeller part are combined together.

9. The method according to claim 5, wherein
the projecting portion of the second impeller part, which is joined to the deep end of the recess portion of the first impeller part at the distal end thereof, is accommodated within the recess portion of the first impeller part which is closed by the dividing plane of the second impeller part.

10. The method according to claim 5, wherein
the dividing planes of the first impeller part and the second impeller part are set so that vanes of the first impeller part overlap at least partially front sides of vanes of the second impeller part when the first impeller part and the second impeller part are combined together.

11. An impeller which is provided so that a plurality of vanes overlap each other back and forth as viewed in a direction of a rotating axis of the impeller, and which is formed by joining together a first impeller member and a second impeller member which are divided through each of the plurality of vanes in the direction of the rotating axis of the impeller via predetermined dividing planes of the first impeller member and the second impeller member, comprising:

a recess portion which is formed in the dividing plane of the first impeller member;

a projecting portion which is provided to project from the dividing plane of the second impeller member, which is formed into a ring shape which is concentric with the rotating axis of the impeller, and which is inserted into the recess portion; and a joining portion where a distal end of the projecting portion and a deep end of the recess portion are joined together.

12. The impeller according to claim 11, wherein
the projecting portion is accommodated within the recess portion which is closed by the dividing plane.

* * * * *